United States Patent
Lee et al.

(10) Patent No.: US 12,554,653 B2
(45) Date of Patent: Feb. 17, 2026

(54) STORAGE DEVICE CACHE SYSTEM WITH MACHINE LEARNING

(71) Applicant: Samsung Electronics Co., Ltd., Suwon-si (KR)

(72) Inventors: Ho Bin Lee, San Jose, CA (US); Jing Yang, San Jose, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 25 days.

(21) Appl. No.: 18/778,907

(22) Filed: Jul. 19, 2024

(65) Prior Publication Data

US 2025/0165405 A1    May 22, 2025

Related U.S. Application Data

(60) Provisional application No. 63/627,054, filed on Jan. 30, 2024, provisional application No. 63/601,195, filed on Nov. 20, 2023.

(51) Int. Cl.
  *G06F 12/121*    (2016.01)
(52) U.S. Cl.
  CPC .................. *G06F 12/121* (2013.01)
(58) Field of Classification Search
  None
  See application file for complete search history.

(56) References Cited

U.S. PATENT DOCUMENTS

| | | | |
|---|---|---|---|
| 11,914,519 B2* | 2/2024 | Inglis | G06F 3/0656 |
| 2019/0095107 A1* | 3/2019 | Wysoczanski | G06F 16/353 |
| 2022/0334747 A1* | 10/2022 | Agarwal | G06F 3/0656 |
| 2022/0365875 A1* | 11/2022 | Mao | G06F 3/0679 |
| 2023/0019966 A1* | 1/2023 | Sabol | G06F 12/0253 |
| 2023/0051328 A1* | 2/2023 | Barczak | G06F 12/0873 |
| 2023/0185457 A1* | 6/2023 | Sanguineti | G06F 3/0616 |
| | | | 711/154 |
| 2024/0070072 A1* | 2/2024 | Roberts | G06F 11/3037 |
| 2024/0143171 A1* | 5/2024 | Helmick | G06F 3/0652 |
| 2024/0411477 A1* | 12/2024 | Li | G06F 3/0655 |
| 2025/0103489 A1* | 3/2025 | Tal | G06F 12/0253 |
| 2025/0156320 A1* | 5/2025 | Kalwitz | G06F 12/0802 |

* cited by examiner

*Primary Examiner* — Edward J Dudek, Jr.
*Assistant Examiner* — Ralph A Verderamo, III
(74) *Attorney, Agent, or Firm* — Renaissance IP Law Group LLP

(57) ABSTRACT

A storage device is disclosed. An interface may receive a write request from an application to store a data. A first storage device may act as a cache. The first storage device may include a first storage unit associated with a first lifetime data. A second storage device may act as a persistent storage. The second storage device may include a second storage unit associated with a first placement data. The first storage device may be configured to store the data in the first storage unit associated with the first lifetime data based on a second lifetime data. The second storage device may be configured to store the data in the second storage unit associated with the first placement data based at least in part on the second lifetime data.

20 Claims, 13 Drawing Sheets

STORAGE DEVICE CACHE SYSTEM WITH MACHINE LEARNING

RELATED APPLICATION DATA

This application claims the benefit of U.S. Provisional Patent Application Ser. No. 63/601,195, filed Nov. 20, 2023, and of U.S. Provisional Patent Application Ser. No. 63/627,054, filed Jan. 30, 2024, both of which are incorporated by reference herein for all purposes.

FIELD

The disclosure relates generally to storage, and more particularly to storing data in a cache system using machine learning.

BACKGROUND

As storage devices continue to grow in capacity, data management is becoming more important. To support larger capacities, storage devices may include a multiple storage devices, some of which may be used as a cache (to buffer data being read from or written to) other storage devices: the other storage devices may be used to store the data persistently.

A need remains to improve performance of storage devices.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
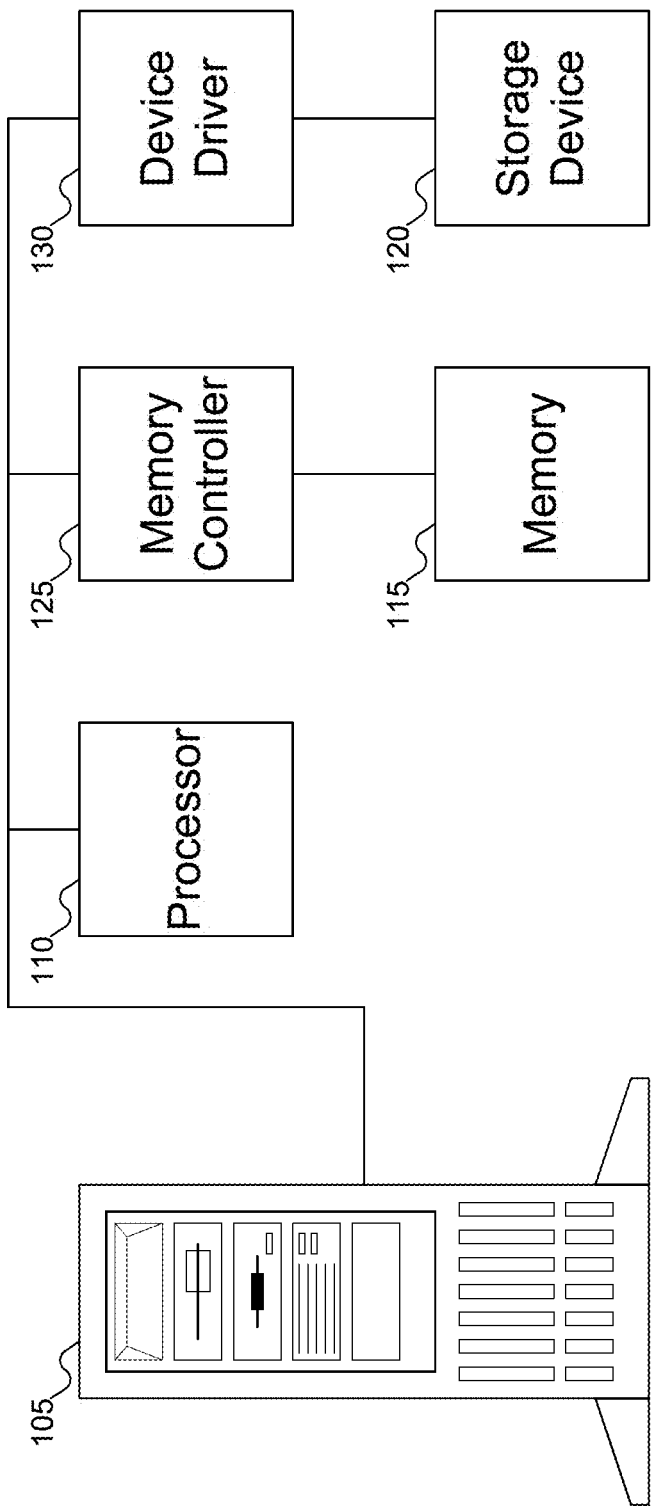
FIG. 1 shows a machine including a storage device, according to embodiments of the disclosure.

A storage device may include a cache SSD and a data SSD. The cache SSD may be a high-performance SSD that may be used to buffer data for later storage on a data SSD, which may be a high-capacity, low-endurance SSD.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Solid State Drives (SSDs), with flash memory, continue to look as the future of storage technology. To support larger and larger data capacities, manufacturers continue to cram more and more data into a single storage device. This push has led to increasing the number of bits stored in a single cell of flash memory. Whereas originally flash memory stored one bit per cell (Single Level Cell, or SLC), the technology has increased to support two bits per cell (Multi-Level Cell, or MLC), three bits per cell (Triple Level Cell, or QLC), and four bits per cell (Quad Level Cell, or QLC), with five bits per cell (Penta Level Cell, or PLC) already having been developed and even higher capacities on the way.

But as more bits are stored in a single cell, the time required to access the values in the cell may increase. This fact is a consequence of how data is stored in a cell in flash memory: the voltage in the cell may be compared against two, four, eight, sixteen, thirty two, or more possible voltage levels to represent the different possible values stored in the cell. With more possible voltage levels, the time required to compare the actual voltage with all the different possible voltage levels my increase the time required to access the data. Thus, for example, a TLC flash memory may be slower to access than an SLC flash memory, even if the number of bits or bytes that may be returned is greater overall for the time required.

Because applications may be time-sensitive, it might be more efficient, from the application's perspective, to read smaller amounts of data over time and return each amount of data faster than to return a large amount of data more slowly. But from the storage device's perspective, it is more efficient to store data using higher numbers of bits per cell than to increase the amount of flash memory that stores fewer bits per cell. That is, a TLC SSD that stores, say, 900 gigabytes (GB) of data may be cheaper to manufacture than three SLC SSDs that each store 300 GB, or to cram enough SLC flash memory into a single enclosure to offer 900 GB of total storage. In fact, given the size limits of the enclosure, it might not even be possible to offer 900 GB of SLC flash memory in a single SSD.

To support faster overall access time but still leverage the larger capacities of higher density SSDs, some storage devices may include two SSDs: a larger, slower SSD for the actual storage, and a smaller, faster SSD to act as a cache. For example, the storage device might include 1 terabyte (TB) of TLC flash memory and 100 GB of SLC flash memory, which may act as a cache/buffer for the TLC flash memory. When writes are received by the storage device, the data may be written to the SLC flash memory, and later may be evicted from the SLC flash memory to be written more permanently to the TLC flash memory. (The SLC flash memory is itself persistent, but the use of the SLC flash memory as a cache or buffer means that data might not be resident in the SLC flash memory for too long.)

But SLC flash memory, like other types of flash memory, may require garbage collection to recover storage capacity that has been invalidated. When garbage collection occurs, other operations may be deferred. Thus, when garbage collection occurs, the SLC flash memory might be unavailable, either for reading or writing, resulting in delays in satisfying requests from the application.

Similarly, the TLC flash memory may be subject to garbage collection. As data is deleted, the data in the TLC flash memory may become fragmented, resulting in delays in the TLC flash media responding to requests.

Embodiments of the disclosure address these problems by managing where data is stored. When an application sends a write request, the write request may include a lifetime data. This lifetime data may be used to manage where the data is stored in the SLC flash media. For example, a lifetime identifier (LTID) may be associated with various blocks, and data received from applications with that LTID may be stored in the flash blocks associated with the LTID in the SLC flash memory. If the application does not provide a lifetime data, a machine learning (ML) algorithm may estimate the lifetime data for the write request, so that the data may be stored accordingly. Data may be evicted from the SLC flash media in the order in which it is written to blocks of various lifetimes, helping to avoid the need to perform garbage collection.

The lifetime data may also be mapped to placement data for the TLC flash memory. The data, when evicted from the SLC flash memory, may be written to the TLC flash memory using the placement data. This placement data, which may be, for example, a placement identifier (PLID) as used in the Flexible Data Placement (FDP) standard.

If the TLC flash memory includes a Redundant Array of Independent Disks (RAID), the RAID may provide a virtual placement data, to which the lifetime data may be mapped. The RAID may then map the virtual placement data to placement data across the various flash memory in the RAID, to improve performance.

FIG. 1 shows a machine including a storage device, according to embodiments of the disclosure. In FIG. 1, machine 105, which may also be termed a host or a system, may include processor 110, memory 115, and storage device 120.

Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115, which may also be referred to as a main memory, may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130.

Storage device 120 may be associated with an accelerator (not shown in FIG. 1). When storage device 120 is associated with an accelerator, the combination may be referred to as a computational storage device, computational storage unit, computational storage device, or computational device. Storage device 120 and the associated accelerator may be designed and manufactured as a single integrated unit, or the accelerator may be separate from storage device 120. The phrase "associated with" is intended to cover both a single integrated unit including both a storage device and an accelerator and a storage device that is paired with an accelerator but that are not manufactured as a single integrated unit. In other words, a storage device and an accelerator may be said to be "paired" when they are physically separate devices but are connected in a manner that enables them to communicate with each other.

In addition, the connection between the storage device and the paired accelerator might enable the two devices to communicate, but might not enable one (or both) devices to work with a different partner: that is, the storage device might not be able to communicate with another accelerator, and/or the accelerator might not be able to communicate with another storage device. For example, the storage device and the paired accelerator might be connected serially (in either order) to a fabric, enabling the accelerator to access information from the storage device in a manner another accelerator might not be able to achieve.

While FIG. 1 uses the generic term "storage device", embodiments of the disclosure may include any storage device formats that may be associated with computational storage, examples of which may include hard disk drives and Solid State Drives (SSDs). Any reference to a specific type of storage device, such as an "SSD", below should be understood to include such other embodiments of the disclosure.

Processor 105 and storage device 120 may be connected to a fabric (not shown in FIG. 1). This fabric may be any fabric along which information may be passed. Such fabrics may include fabrics that may be internal to machine 105, and which may use interfaces such as Peripheral Component Interconnect Express (PCIe), Serial AT Attachment (SATA), or Small Computer Systems Interface (SCSI), among others. Such fabrics may also include fabrics that may be external to machine 105, and which may use interfaces such as Ethernet, Infiniband, or Fibre Channel, among others. In addition, such fabrics may support one or more protocols, such as Non-Volatile Memory Express (NVMe), NVMe over Fabrics (NVMe-oF), Simple Service Discovery Protocol (SSDP), or a cache-coherent interconnect protocol, such as the Compute Express Link® (CXL®) protocol, among others. (Compute Express Link and CXL are registered trademarks of the Compute Express Link Consortium in the United States.) Thus, such fabrics may be thought of as encompassing both internal and external networking connections, over which commands may be sent, either directly or indirectly, to storage device 120 (and more particularly, to an accelerator associated with storage device 120, if such accelerator is included in machine 105). In embodiments of the disclosure where such fabrics support external networking connections, storage device 120 and/or the associated accelerator (if included) might be located external to machine 105, or they may be internal to machine 105 but accessible to processors located external to machine 105.

Figure 2:
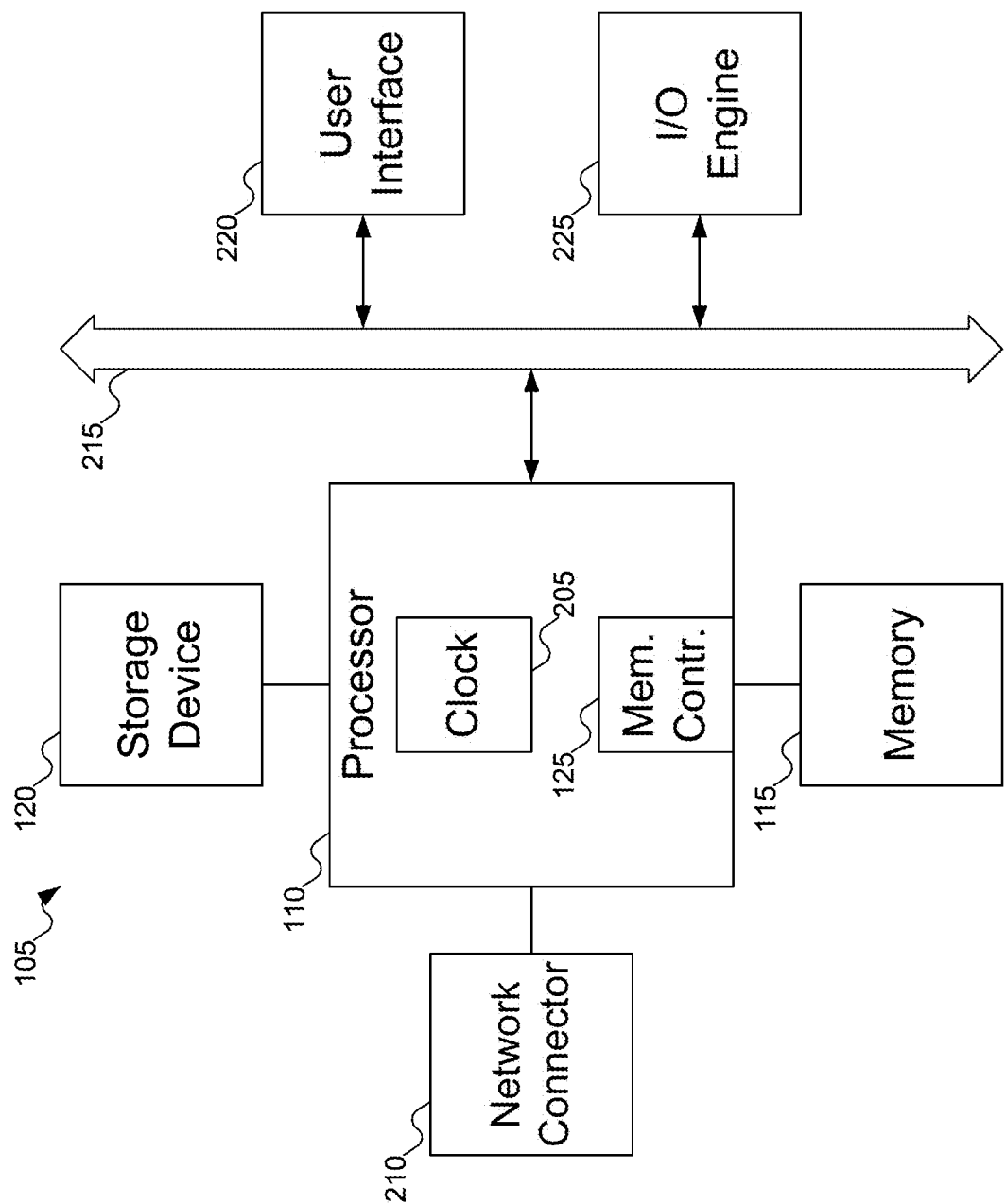
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
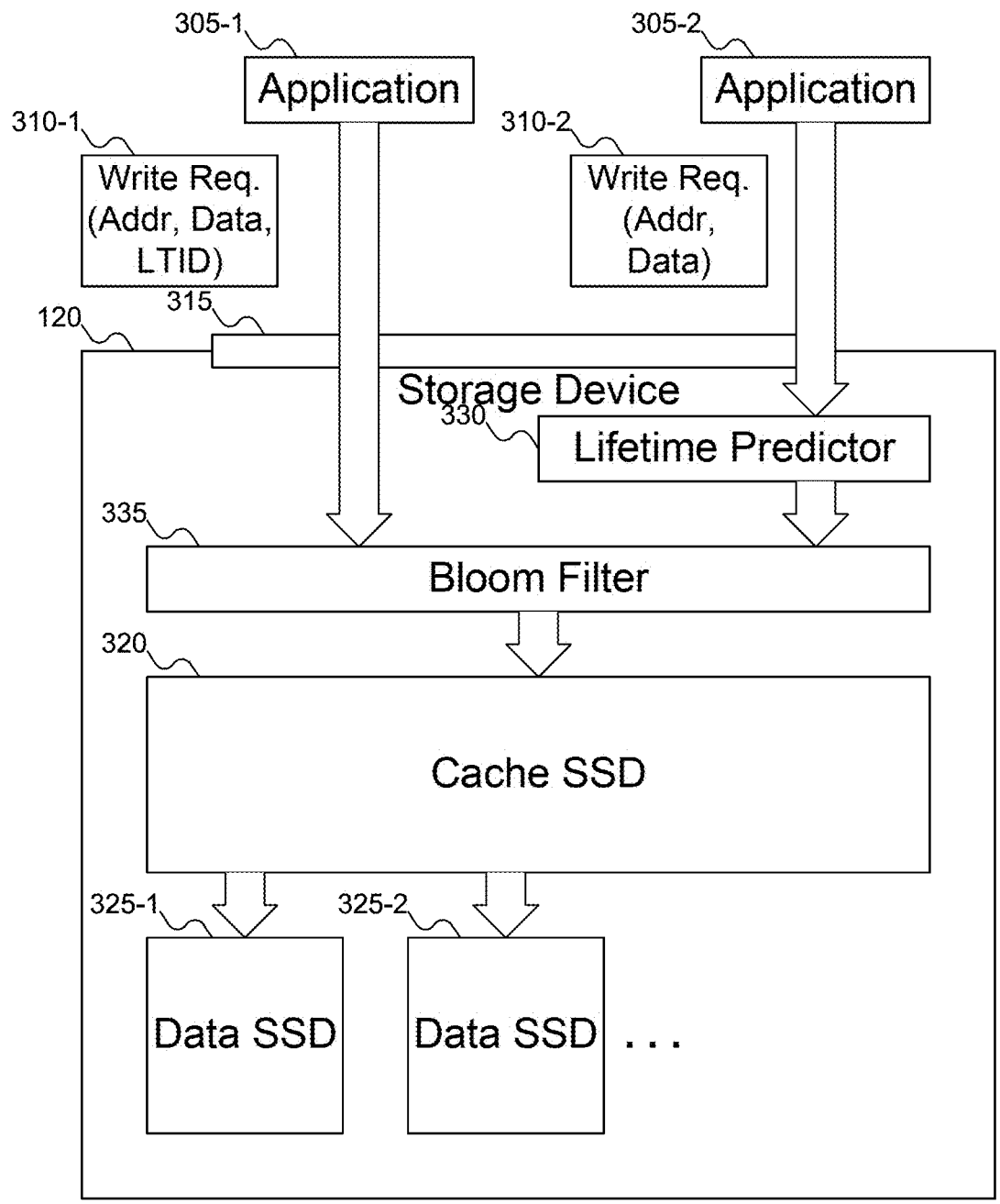
FIG. 3A shows how the storage device of FIG. 1 may process write requests using a cache SSD and a data SSD, according to embodiments of the disclosure.

FIG. 3A shows how storage device 120 of FIG. 1 may process write requests using a cache SSD and a data SSD, according to embodiments of the disclosure. In FIG. 3A, applications 305-1 and 305-2 are shown. (Applications 305-1 and 305-2 may be referred to collectively as applications 305.) Application 305-1 is shown as issuing write request 310-1, whereas application 305-2 is shown as issuing write request 310-2. (Write requests 310-1 and 310-2 may be referred to collectively as write requests 310.) Storage device 120 may receive write requests 310 via interface 315, which may include a connection to the fabric that connects storage device 120 with processor 110 of FIG. 1.

The data received in write requests 310 may be stored initially in cache SSD 320. Cache SSD 320, which may also be termed a first storage device or a high-performance SSD, may act as a cache or a buffer for data. While FIG. 3A shows only one cache SSD 320, embodiments of the disclosure may support including any number (one or more) of cache SSDs 320. The data may ultimately be written to data SSDs 325-1 and 325-2, which may be referred to collectively as data SSDs 325. While FIG. 3A shows two data SSDs 325, embodiments of the disclosure may include any number (one or more) of data SSDs 325. Data SSDs 325 may also be termed a second storage device or a high-capacity, low-endurance SSD. For example, cache SSD 320 may include a relatively smaller SSD using Single Level Cell (SLC) flash media, whereas data SSDs 325 may include a relatively larger SSD using Multi-Level Cell (MLC), Triple Level Cell (TLC), Quad Level Cell (QLC), Penta Level Cell (PLC), or any other flash media. Because of the increased bit density in cells in data SSD 325, data SSD 325 may offer greater storage capacity than cache SSD 320, but may be slower to read from or write to than cache SSD 320, and may offer a lower maximum program-erase cycle count than cache SSD 320. While the example above gives cache SSD 320 specifically as an SLC flash media SSD, embodiments of the disclosure may support the use of any variety of SSD for either cache SSD 320 and/or data SSD 325, although in general the performance and endurance of cache SSD 320 may be higher than the performance and endurance of data SSD 325, whereas the capacity of data SSD 325 may be greater than the capacity of cache SSD. 320.

Cache SSD 320 may evict data for storage into data SSD 325 at any desired time. For example, cache SSD 320 may evict data when cache SSD 320 starts to exceed a certain percentage of its maximum capacity (for example, 80%). Or, cache SSD 320 may evict data when the workload on cache SSD 320 drops below some threshold (for example, below 500 input/output operations per second (IOPS), or below 500 megabytes per second (MB/sec) in bandwidth). Or, cache SSD 320 may wait until garbage collection is triggered: the data in the blocks selected for garbage collection may be evicted, so that there is no need to program that data to new locations in cache SSD 320. Or, cache SSD 320 may use some sort of eviction policy, such as a Least Recently Used (LRU) or Least Frequently Used (LFU) policy, which may select data for eviction and which may use any desired schedule to evict data. Upon eviction, the data may be written to data SSDs 325.

As mentioned above, cache SSD 320 and data SSD 325 may be any desired form of SSD. As such, cache SSD 320 and data SSD 325 may be subject to garbage collection to recover pages or blocks that have been used and invalidated. Because garbage collection may impact the performance of cache SSD 320 and data SSD 325, the selection of where to store data in cache SSD 320 and data SSD 325 may be pertinent to attempting to minimize garbage collection. How cache SSD 320 and data SSD 325 may write data is discussed further with reference to FIG. 5 below.

Note that in write request 310-1, application 305-1 may provide the address, or data identifier, associated with the data, the data itself, and a lifetime identifier (LTID). The address may be, for example, a logical block address (LBA) used by application 305-1 to identify the data: cache SSD 320 and data SSD 325 may map the data identifier to a physical address on cache SSD 320 and data SSD 325 where the data is ultimately stored.

The LTID may be an example of any type of lifetime data that may be used by storage device 120 in managing where data is written on cache SSD 320 and data SSD 325. Application 305-1 may provide the lifetime data as part of write request 310-1 to give storage device 120 (and therefore cache SSD 320 and data SSD 325) hints about how long the data in write request 310-1 is to be kept. Cache SSD 320 and data SSD 325 may use the lifetime data (or other data derived from the lifetime data) to determine where to store the data on cache SSD 320 and data SSD 325, which may help to minimize the need for garbage collection. In some embodiments of the disclosure, the lifetime data may be a duration that the data is expected to be retained for application 305; in other embodiments of the disclosure, the lifetime data may be an approximation of when (in time) the data is expected to be expired. Embodiments of the disclosure may also use other forms of lifetime data.

In contrast, write request 310-2, issued by application 305-2, may provide only the address or data identifier and the data: no lifetime data may be provided. In situations where application 305-2 does not provide the lifetime data, storage device 120 may include lifetime predictor 330 to predict how long the data in write request 310-2 may be kept by application 305-2. Note that since write request 310-1 includes the lifetime data, lifetime predictor 330 does not need to be used to predict the lifetime of the data in write request 310-1: lifetime predictor 330 may be used only for write request 310-2. But in some embodiments of the disclosure, lifetime predictor 330 may be used to predict the lifetime of data even in write request 310-1, where application 305-1 has provided a lifetime data. If the lifetime predicted by lifetime predictor 330 does not agree with the lifetime data provided by application 305-1, the two may be reconciled in any desired manner. For example, the lifetime data from predictor 330 may trump the lifetime data provided in write request 310-1. Or, the two lifetime data may be averaged together or otherwise combined using weights to determine the overall lifetime data to apply. For example, the lifetime data provided in write request 310-1 might be weighted 60%, 70%, or 80% and the lifetime data calculated by lifetime predictor 330 might be weighted 40%, 30%, or 20% (to favor the prediction of application 305-1 without relying on application 305-1 entirely). Any desired weight values may be used: the weights shown above are merely example weights.

Ideally, data written to cache SSD 320 may be more permanently stored in data SSD 325 before that data is replaced by new data. But in some situations, one write request 310 may write some data, associated with a particular address or data identifier, to cache SSD 320, and before that data is transferred to data SSD 325, a second write request 310 may be received that overwrites that data associated with a particular address or data identifier with new data. Bloom filter 335 may be used in that situation.

Bloom filter 335 may scan the blocks in cache SSD 320 (or, more particularly, bloom filter 335 may examine the flash translation layer table of cache SSD 320) to see if cache SSD 320 stores any data associated with a newly received data identifier. If so, bloom filter 335 may delete that data from cache SSD 320 without evicting it to data SSD 325, as that data has been replaced by the new write request 310.

Figure 3B:
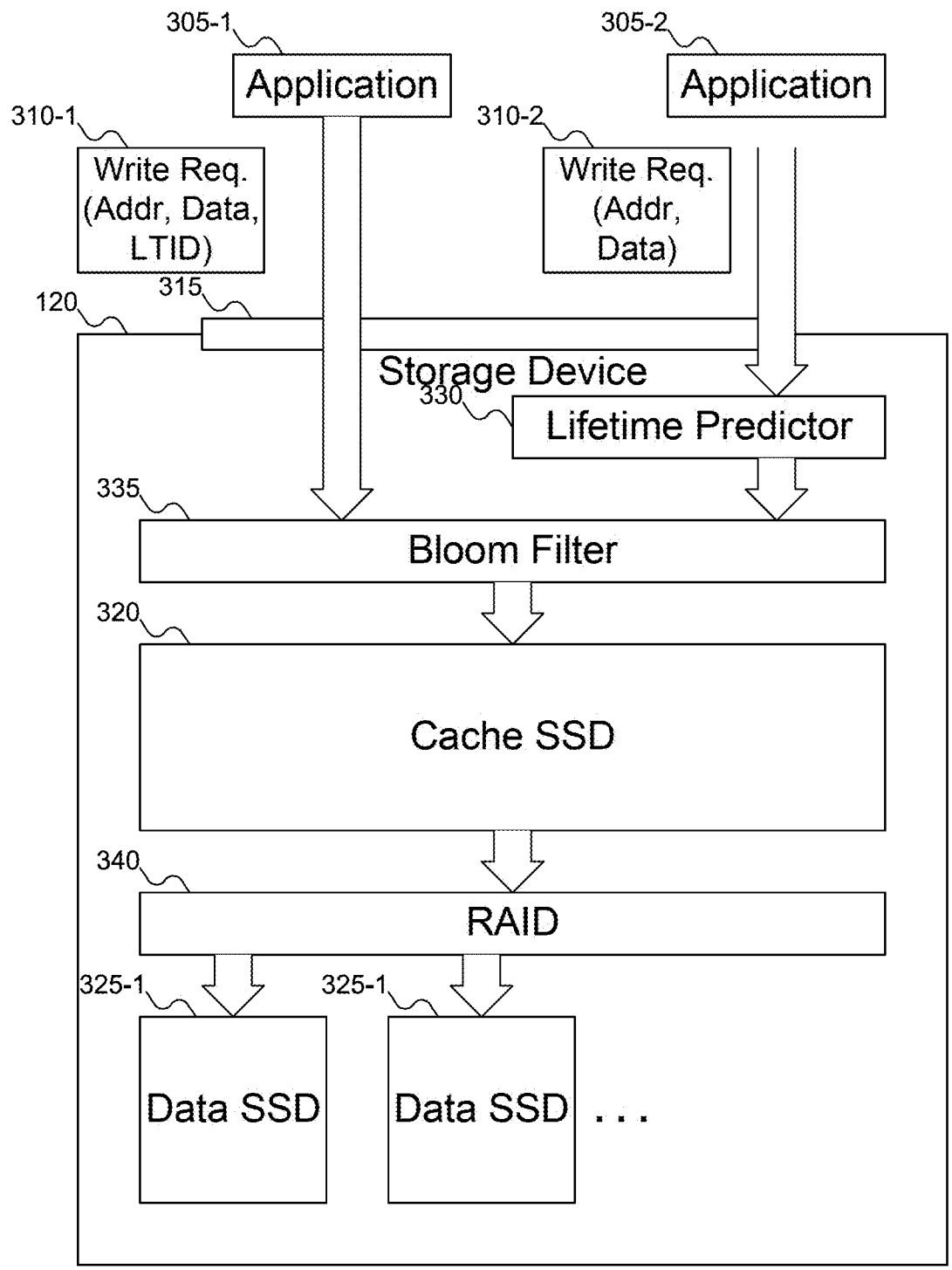
FIG. 3B shows how the storage device of FIG. 1 may process write requests using a cache SSD and a RAID of data SSDs, according to embodiments of the disclosure.

FIG. 3B shows how storage device 120 of FIG. 1 may process write requests using a cache SSD and a RAID of data SSDs, according to embodiments of the disclosure. In FIG. 3B, applications 305 and write requests 310 are the same, as is most of the structure of storage device 120. The difference is that instead of data being written to data SSDs 325 directly, data SSDs 325 may be "hidden" behind Redundant Array of Independent Disks (RAID) 340. RAID 340 may implement any desired level of RAID or erasure coding, spreading data across data SSDs 325 according to a selected level. For example, RAID 340 may implement RAID level 5 (in which case there may be at least three data SSDs 325), with two of data SSDs 325 having data written to them and one of data SSDs 325 having parity data written to it (in RAID 5, the data and the parity information may be distributed across all of data SSDs 325, so that no individual data SSD 325 may be a bottleneck). The use of RAID level 5 is merely an example: any RAID level or other erasure coding level may be selected without limitation.

RAID 340 may be implemented using a circuit (hardware) designed to support RAID implementations, or RAID 340 may be implemented as software and may run on some sort of processor included in storage device 120. Hardware implementations of RAID tend to be more efficient than software implementations, but both are possible and may be used in embodiments of the disclosure.

Figure 4:
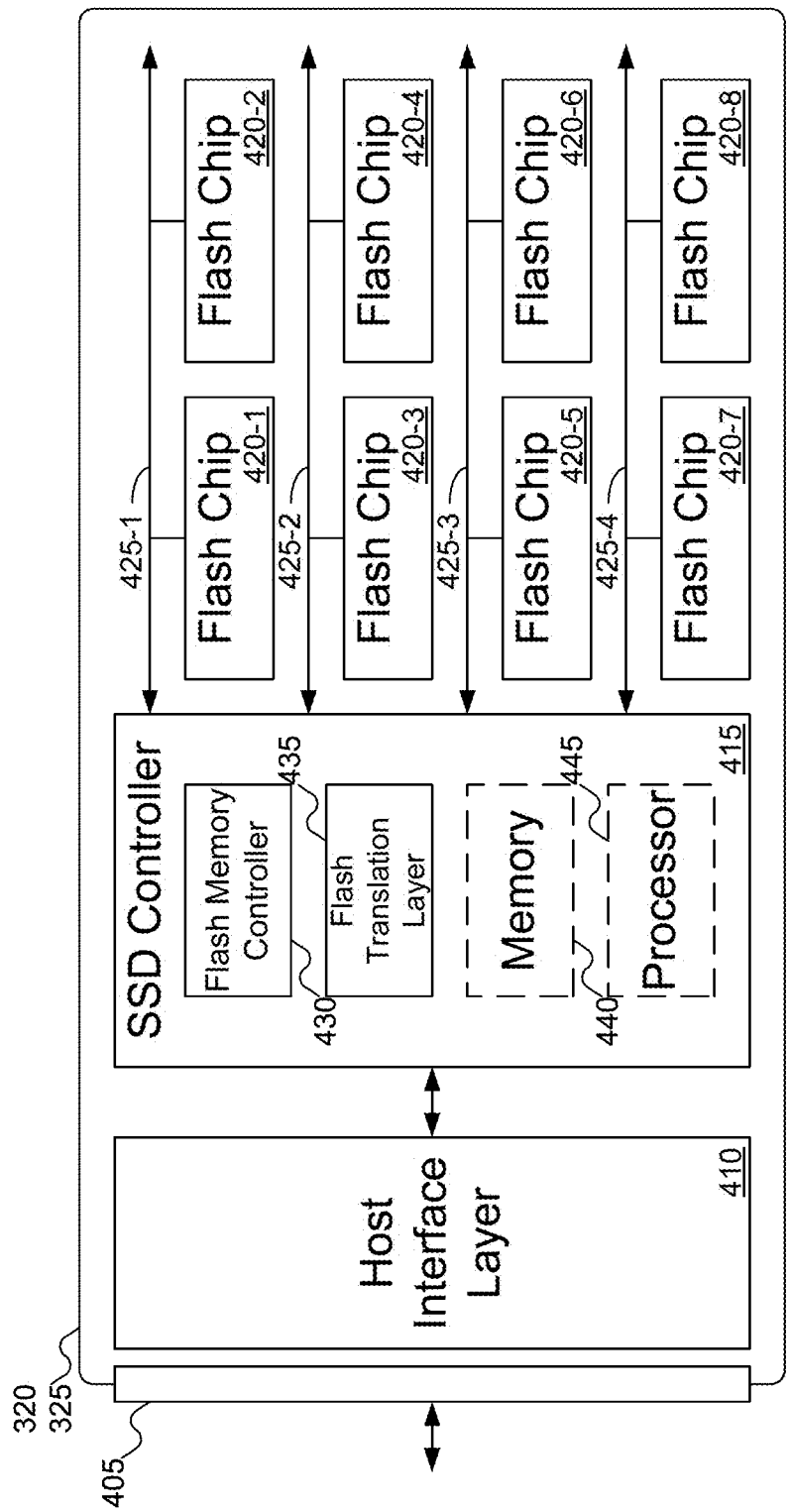
FIG. 4 shows details of the cache SSD of FIGS. 3A-3B and the data SSD of FIGS. 3A-3B, according to embodiments of the disclosure.

FIG. 4 shows details of cache SSD 320 of FIGS. 3A-3B and data SSD 325 of FIGS. 3A-3B, according to embodiments of the disclosure. In FIG. 4, cache SSD 320 and/or data SSD 325 are shown using an implementation including SSD 320 and/or 325, but embodiments of the disclosure are applicable to any type of storage device that may perform garbage collection or media management, as discussed below.

SSD 320 and/or 325 may include interface 405 and host interface layer 410. Interface 405 may be an interface used to connect SSD 320 and/or 325 to machine 105 of FIG. 1. SSD 320 and/or 325 may include more than one interface 405: for example, one interface might be used for block-based read and write requests, and another interface might be used for key-value read and write requests. While FIG. 4 suggests that interface 405 is a physical connection between SSD 320 and/or 325 and machine 105 of FIG. 1, interface 405 may also represent protocol differences that may be used across a common physical interface. For example, SSD 320 and/or 325 might be connected to machine 105 using a U.2, Enterprise and Datacenter Standard Form Factor (EDSFF), or an M.2 connector, among other possibilities, and SSD 320 and/or 325 may support block-based requests and key-value requests: handling the different types of requests may be performed by a different interface 405. SSD 320 and/or 325 may also include a single interface 405 that may include multiple ports, each of which may be treated as a separate interface 405, or just a single interface 405 with a single port, and leave the interpretation of the information received over interface 405 to another element, such as SSD controller 415.

Host interface layer 410 may manage interface 405, providing an interface between SSD controller 415 and the external connections to SSD 320 and/or 325. If SSD 320 and/or 325 includes more than one interface 405, a single host interface layer 410 may manage all interfaces, SSD 320 and/or 325 may include a host interface layer 410 for each interface, or some combination thereof may be used.

SSD 320 and/or 325 may also include SSD controller 415 and various flash memory chips 420-1 through 420-8, which may be organized along channels 425-1 through 425-4. Flash memory chips 420-1 through 420-8 may be referred to collectively as flash memory chips 420, and may also be referred to as flash chips, memory chips, NAND chips, chips, or dies. Channels 425-1 through 425-4 may be referred to collectively as channels 425. Flash memory chips 420 collectively may represent device persistent storage 330 of FIG. 3. SSD controller 415 may manage sending read requests and write requests to flash memory chips 420 along channels 425. Controller 415 may also include flash memory controller 430, which may be responsible for issuing commands to flash memory chips 420 along channels 425. Flash memory controller 430 may also be referred to more generally as memory controller 430 in embodiments of the disclosure where storage device 320 and/or 325 stores data using a technology other than flash memory chips 420. Although FIG. 4 shows eight flash memory chips 420 and four channels 425, embodiments of the disclosure may include any number (one or more, without bound) of channels 425 including any number (one or more, without bound) of flash memory chips 420.

Within each flash memory chip or die, the space may be organized into planes. These planes may include multiple erase blocks (which may also be referred to as blocks), which may be further subdivided into wordlines. The wordlines may include one or more pages. For example, a wordline for Triple Level Cell (TLC) flash media might include three pages, whereas a wordline for Multi-Level Cell (MLC) flash media might include two pages.

Erase blocks may also be logically grouped together by controller 415, which may be referred to as a superblock. This logical grouping may enable controller 415 to manage the group as one, rather than managing each block separately. For example, a superblock might include one or more erase blocks from each plane from each die in storage device 320 and/or 325. So, for example, if storage device 320 and/or 325 includes eight channels, two dies per channel, and four planes per die, a superblock might include 8×2×4=64 erase blocks.

SSD controller 415 may also include flash translation layer (FTL) 435 (which may be termed more generally a translation layer, for storage devices that do not use flash storage). FTL 435 may handle translation of LBAs or other logical IDs (as used by processor 110 of FIG. 1) and physical block addresses (PBAs) or other physical addresses where data is stored in flash chips 420. FTL 435, may also be responsible for tracking data as it is relocated from one PBA to another, as may occur when performing garbage collection and/or wear leveling.

Finally, in some embodiments of the disclosure, SSD controller 415 may include memory 440 and/or processor 445. Memory 440 may be used as local memory for any processing to be performed by controller 415 (and possibly by processor 445, if included in SSD 320 and/or 325). Processor 445 may be used, for example, to provide acceleration functions as discussed with reference to FIG. 1 above, and may use memory 440 as a local memory for such processing. Note that SSD 320 and/or 325 might include memory 440 and/or processor 345 somewhere else in SSD 320 and/or 325 other than SSD controller 415: FIG. 4 shows SSD controller 415 as including device local memory 420 and processor 345 merely as an example location for these elements.

Figure 5:
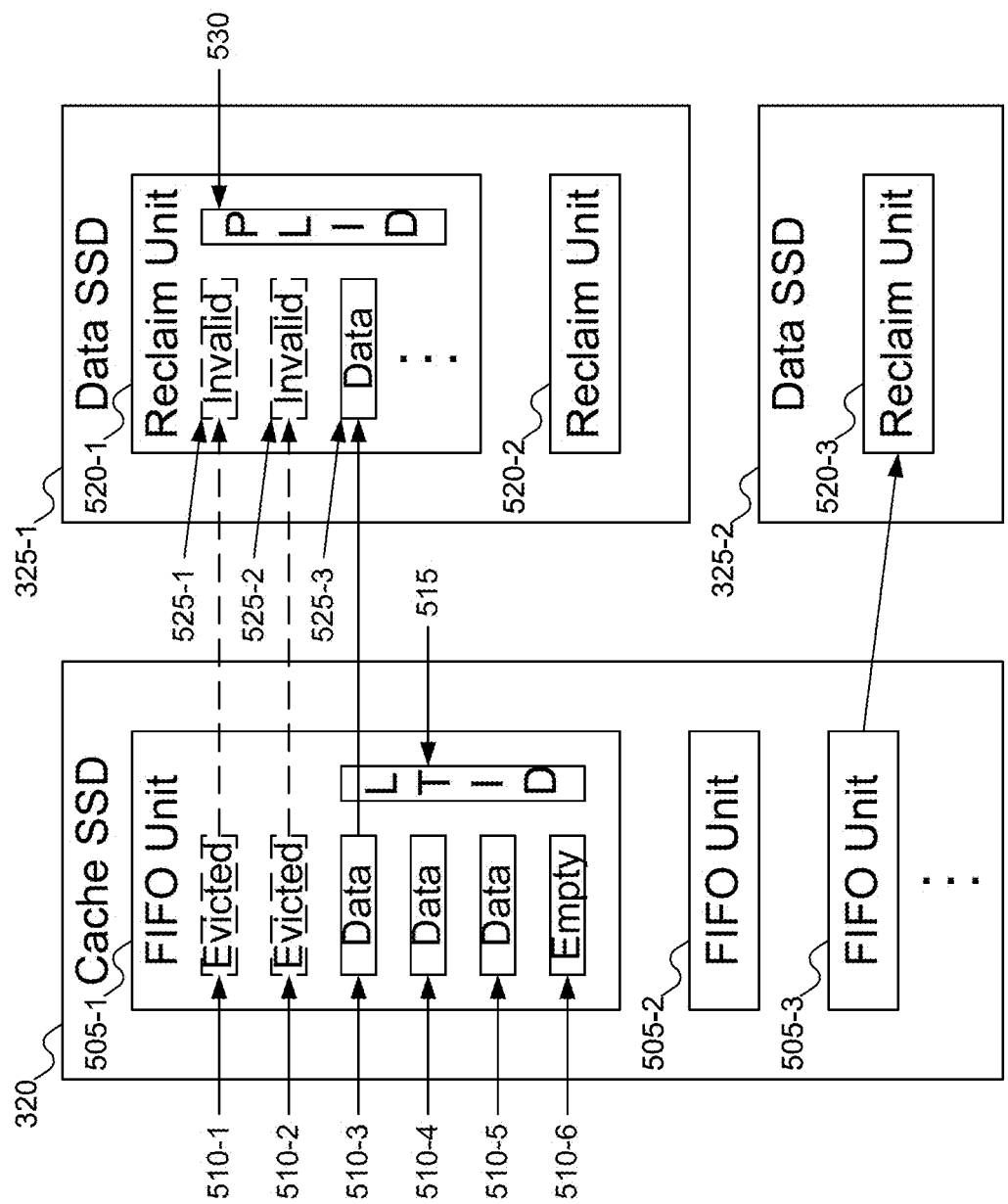
FIG. 5 shows details of how data may be stored in the cache SSD of FIGS. 3A-3B and the data SSD of FIGS. 3A-3B, according to embodiments of the disclosure.

FIG. 5 shows details of how data may be stored in cache SSD 320 of FIGS. 3A-3B and data SSD 325 of FIGS. 3A-3B, according to embodiments of the disclosure. Recall that in FIGS. 3A-3B, either write request 310 of FIGS. 3A-3B includes the lifetime data, or lifetime predictor 330 of FIGS. 3A-3B may generate the lifetime data for write request 310 of FIGS. 3A-3B. Either way, the lifetime data is available for any given write request 310 of FIGS. 3A-3B.

As shown in FIG. 5, cache SSD 320 may include various First In, First Out (FIFO) units 505-1, 505-2, and 505-3, which may be referred to collectively as FIFO units 505. FIFO units may also be referred to more generically as storage units, and which may be blocks, superblocks, or any other desired sub-division of data in cache SSD 320. Each FIFO unit 505 may include various pages, such as pages 510-1 through 510-6, which may be referred to collectively as pages 510, and which may also be any other desired sub-division of FIFO unit 505. Data, received as write requests 310 of FIGS. 3A-3B, may be written to FIFO units 505.

To write data to FIFO units 505, cache SSD 320 may start by identifying the lifetime data associated with write request 310 of FIGS. 3A-3B (again, either included with write request 310 of FIGS. 3A-3B by application 305 of FIGS. 3A-3B or generated by lifetime predictor 330 of FIGS. 3A-3B). Cache SSD 320 may then determine which FIFO unit 505 stores data associated with the lifetime data associated with write request 310 of FIGS. 3A-3B. Note, for example, that FIFO unit 505-1 includes lifetime data 515: other FIFO units 505 may similarly include lifetime data 515 associated with them as well, even if not shown as such in FIG. 5. Each FIFO unit 505 may be associated with a different lifetime data, so that data with different lifetimes may be managed using cache SSD 320. While FIG. 5 shows FIFO unit 505 as including lifetime data 515, embodiments of the disclosure may include storing such metadata elsewhere: for example, in a table somewhere that maps a particular lifetime data 515 the FIFO unit(s) 505 currently associated with that lifetime data 515.

Once FIFO unit 505 associated with the lifetime data for the data has been identified, an empty page 510 in FIFO unit 505 may be located. In some embodiments of the disclosure, pages 510 may be written to in order received in FIFO unit 505 (the "First In" in FIFO); in other embodiments of the disclosure, the data may be written to any free page in FIFO unit 505. Thus, for example, FIG. 5 shows that pages 510-3, 510-4, and 510-5 currently store data, whereas page 510-6 is currently empty and free to store data. Thus, the new data may be written to page 510-6 in FIFO unit 505-1.

Since FIFO unit 505-1 would be full after the data is written to page 510-6, a new FIFO unit in cache SSD 320 may be selected and associated with lifetime data 515. In this manner, cache SSD 320 may continue to receive data with that same lifetime data.

Eventually, it may be expected that data will be evicted from cache SSD 320 to be written to data SSD 325. As discussed above with reference to FIGS. 3A-3B, when such eviction is to occur may be determined using an eviction policy. When FIFO unit 505 is selected to evict data, the oldest data currently stored in FIFO unit 505 may be selected for eviction. Thus, in FIG. 5, pages 510-1 and 510-2 have previously been evicted from cache SSD 320, and the next data to be evicted may be the data in page 510-3. In some embodiments of the disclosure, the oldest data in FIFO unit 505 may be selected for eviction (the "First Out" in FIFO); in other embodiments of the disclosure, any data may be selected for eviction from FIFO unit 505. Thus, pages 510-1 and 510-2 reflect that the data stored therein has already been evicted, and page 510-3 is currently selected for eviction. While FIG. 5 suggests that eviction occurs one page at a time, embodiments of the disclosure may evict data from cache SSD 320 in any desired unit: a single page, multiple pages, a single block, multiple blocks, etc.

Once data is selected for eviction from cache SSD 320, that data may be sent to data SSD 325 for writing: once written to data SSD 325, the data may be safely deleted: the status of page 510-3 may be changed from "data" to "evicted". (Obviously, labels such as "evicted", "data", and "empty" are merely symbolic, and what pages 510 are empty, store valid data, or have been invalidated may be reflected using any desired approach.)

Data SSD 325 may also be managed to attempt to minimize garbage collection. In some embodiments of the disclosure, data SSD 325 may use a data placement strategy such as Flexible Data Placement (FDP). As shown in FIG. 5, data SSD 325-1 may include various reclaim units 520-1 and 520-2, and data SSD 325-2 may include reclaim unit 520-3. Reclaim units 520-1, 520-2, and 520-3 may be referred to collectively as reclaim units 520, may also be referred to more generically as storage units, and may be blocks, superblocks, or any other desired sub-division of data in data SSD 325. Each reclaim unit 520 may include various pages, such as pages 525-1 through 525-3, which may be referred to collectively as pages 525, and which may also be any other desired sub-division of reclaim unit 520. Data, received as write requests 310 of FIGS. 3A-3B, may be written to reclaim units 520.

FDP may associate each reclaim unit 520 with placement data, such as placement identifier (PLID) 530. Placement data 530 may be a way of grouping together related data. In some embodiments of the disclosure, placement data 530 may be used as a way to group together data expected to be expired at approximately the same time.

The question may arise why cache SSD 320 uses lifetime data 515 to organize the data, whereas data SSD 325 uses placement data 530 to organize data: why can't lifetime data 515 be used for both? There are at least two reasons for the difference. First it may happen that data SSD 325 may support fewer placement data 530 than cache SSD 320 may support lifetime data 515. For example, some data SSDs 325 might support only eight unique placement data 530. If data SSD 325 supports fewer placement data 530 than cache SSD 320 may support lifetime data 515, then not every lifetime data 515 may be used with data SSD 325. Second, by using different forms of data in cache SSD 320 and data SSD 325, a more general solution may be supported. Thus, cache SSD 320 (or more generally, storage device 120 of FIG. 1) may include a mapping from lifetime data 515 to placement data 530 to support storing data on the various SSDs using different types of data.

In FIG. 5, lifetime data 515 may be mapped to placement data 530. Thus, data from FIFO unit 505, when evicted from cache SSD 320, may be written to reclaim unit 520 associated with placement data 530. For example, the data in pages 510-1, 510-2, and 510-3 of FIFO unit 505-1 may be written respectively to pages 525-1, 525-2, and 525-3 of reclaim unit 520-1. In some embodiments of the disclosure, this mapping from lifetime data 515 to placement data 530 may be generated when storage device 120 of FIG. 1 first boots: cache SSD 320 and data SSDs 325 may be queried for their supported lifetime data 515 and placement data 530 respectively, and lifetime data 515 may be mapped to placement data 530 in any desired approach. For example, lifetime data 515 may be mapped to placement data 530 in a round robin fashion, and multiple lifetime data 515 might map to a common placement data 530. In other embodiments of the disclosure, this mapping from lifetime data 515 to placement data 530 may be generated on an ad hoc basis, as needed: when a new lifetime data 515 is encountered, it may be mapped to a selected placement data 530: this selection of placement data 530 may again be done using any desired approach, such as in a round robin fashion.

The question might occur: if data with the same lifetime data 515 is expected to be invalidated at approximately the same time, why are pages 525-1 and 525-2 showing that the data has been invalidated already. The answer is that lifetime data 515 may be an approximation or a "best guess", even by application 305 of FIGS. 3A-3B. But an approximation is not a guarantee, and sometimes data may be invalidated sooner than expected, or may be retained longer than expected. In addition, if data is updated to new data associated with the same data identifier, then the old data should be invalidated to make room for the new data. For example, it might be that the data previously stored in pages 525-1 and 525-2 was updated but has not yet been invalidated outright, and pages 525-1 and 525-2 have been invalidated in favor of the newer data. Thus, garbage collection might still occur on cache SSD 320 or data SSD 325.

Note that different FIFO units 505 may have the evicted data written to different reclaim units 520, and in different data SSDs 325. For example, while data evicted from FIFO unit 505-1 may be written to reclaim unit 520-1 in data SSD 325-1, data evicted from FIFO unit 505-3 may be written to reclaim unit 520-3 in data SSD 325-2. This result might happen for a number of reasons. First, it might be that different lifetime data 515 are associated not only with a particular placement data 520, but also with a particular data SSD 325. This approach may distribute the data across multiple data SSDs 325, to avoid one data SSD 325 having a higher or lower than average workload. Second, when applications 305 of FIGS. 3A-3B start, they might identify a particular data SSD 325 as the target for their data. Then, any data written to cache SSD 320 from the application may, when evicted, be written to reclaim unit 520 in data SSD 325 associated with that application. In some embodiments of the disclosure, the assignment of applications 305 of FIGS. 3A-3B to data SSDs 325 may be established when applications 305 of FIGS. 3A-3B begin execution; in other embodiments of the disclosure, the assignment of applications 305 of FIGS. 3A-3B to data SSDs 325 may be performed when applications 305 of FIGS. 3A-3B begin to issue write requests 310 of FIGS. 3A-3B, and may even happen on a per-write request 310 of FIGS. 3A-3B basis (with data from different write requests 310 of FIGS. 3A-3B from the same application potentially being written to different data SSDs 325).

While FIG. 5 shows cache SSD 320 as including three FIFO units 505 and six pages 510 per FIFO unit 505, embodiments of the disclosure may include any number (one or more) of FIFO units 505 and any number of pages per FIFO unit 505. For example, a one TB SSD, with four kilobytes (KB) per page and 64 pages per block would include approximately 4,194,304 blocks. Similarly, while FIG. 5 shows data SSD 325-1 as including two reclaim units 520 and data SSD 325-2 as including one reclaim unit, and three pages per reclaim unit 520, data SSDs 325 may have any number (one or more) of reclaim units 520 and any number of pages per reclaim unit 520.

Figure 6:
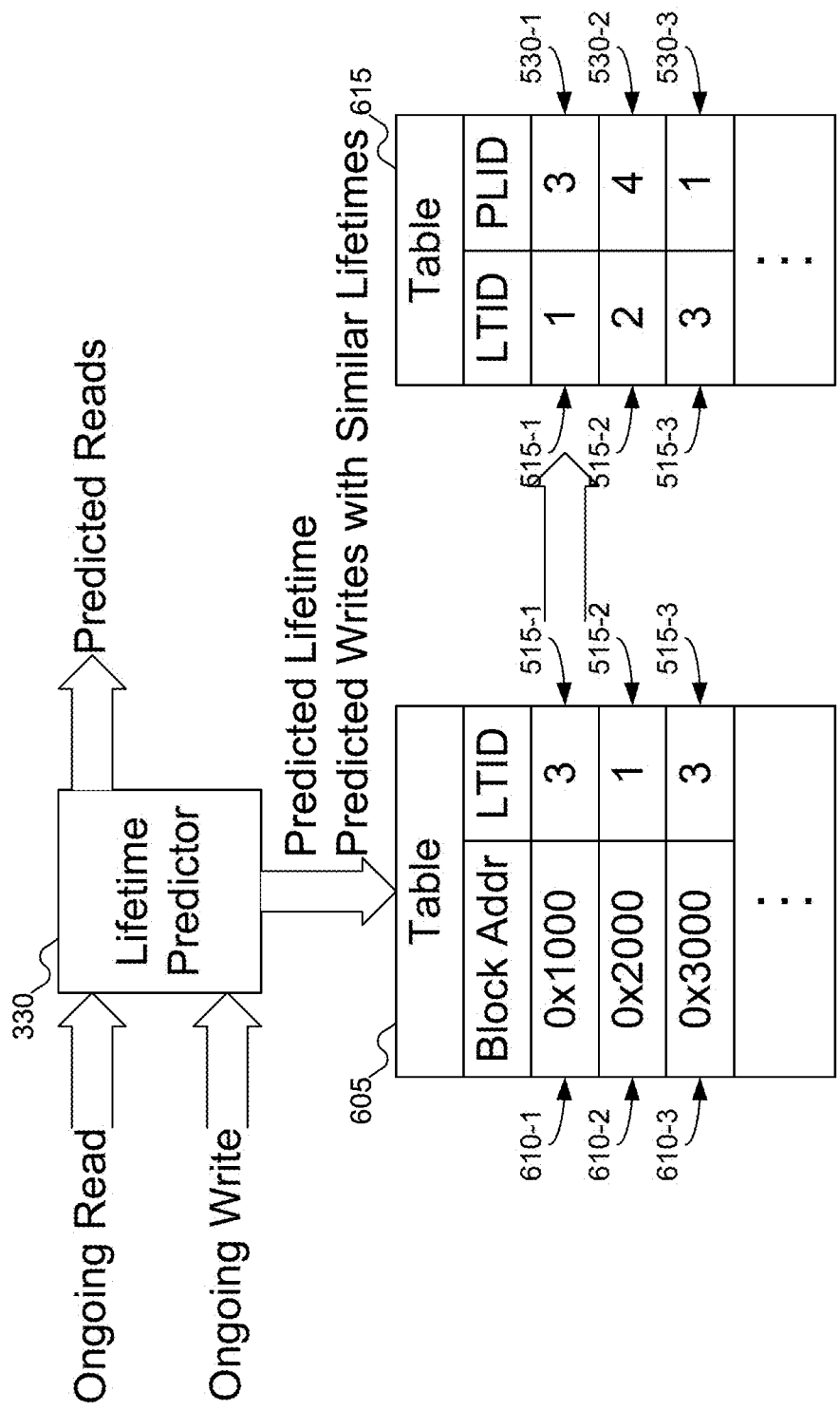
FIG. 6 shows the operation of the lifetime predictor of FIGS. 3A-3B and the tables to map the lifetime data of FIGS. 3A-3B to the placement data of FIGS. 3A-3B, according to embodiments of the disclosure.

FIG. 6 shows the operation of lifetime predictor 330 of FIGS. 3A-3B and the tables to map the lifetime data of FIGS. 3A-3B to the placement data of FIGS. 3A-3B, according to embodiments of the disclosure. In FIG. 6, lifetime predictor 330, which may use, for example, Seq2Seq models, may receive as input an ongoing read. As a result, lifetime predictor 330 may be able to predict what reads may soon be requested by applications 305 of FIGS. 3A-3B. Lifetime predictor 330 may also receive as input an ongoing write. As a result, lifetime predictor 330 may be able to predict lifetime data 515 for that write, and may also predict future writes that may have similar lifetime data 515. Once predicted by lifetime predictor 330, table 605 may be generated, which may store an association, or mapping, between the data identifiers of write requests 310 of FIGS. 3A-3B and lifetime data 515. For example, table 605 shows associations between data identifiers 610-1, 610-2, and 610-3 and lifetime data 515-1, 515-2, and 515-3, respectively. (Of course, if applications 305 of FIGS. 3A-3B provide lifetime data 515, then the provided lifetime data 515 may be used in table 605 without invoking lifetime predictor 330.)

It may happen that lifetime predictor 330 (or applications 305 of FIGS. 3A-3B) might provide a new lifetime data 515 not seen before previously. In that case, the mappings that use the new lifetime data 515 may be generated when needed. For example, table 605 may be updated to support a new lifetime data 515.

The information in table 605 may also be used to generate table 615, which may represent the association, or mapping, between lifetime data 515 and placement data 530. Thus, for example, table 615 shows associations between lifetime data 515-1, 515-2, and 515-3 and placement data 530-1, 530-2, and 530-3, respectively. In embodiments of the disclosure where lifetime data 515 may be mapped to a placement data 530 on a unique data SSD 325 of FIGS. 3A-3B, table 615 may be supplemented to identify that data SSD 325 of FIGS. 3A-3B as well.

While FIG. 6 shows tables 605 and 615 each as having three associations, embodiments of the disclosure may support any number (one or more) of associations in either table, and each table 605 and 615 may have a different number of associations.

Figure 7:
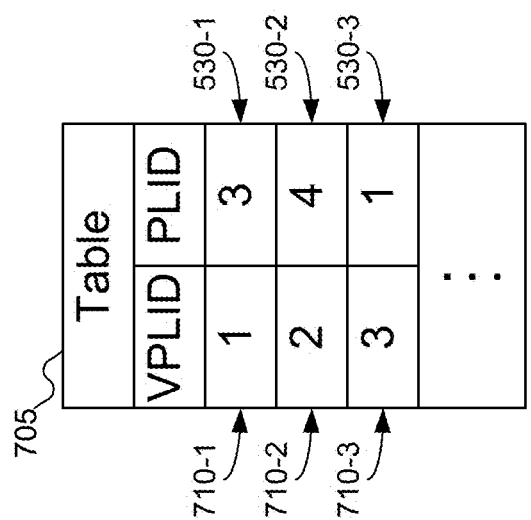
FIG. 7 shows a table mapping a virtual placement data as used in the RAID of data SSDs of FIG. 3B to the placement data of FIG. 3B, according to embodiments of the disclosure.

When a RAID is used, as shown in FIG. 3B, the individual data SSDs 325 of FIG. 3B may not be visible outside the RAID. Thus, to support data distribution across data SSDs 325 of FIG. 3B in the RAID, the RAID may expose its own placement data to storage device 120 of FIG. 1, and may map or associate that exposed placement data with placement data 530 of FIG. 5. FIG. 7 illustrates this association.

In FIG. 7, the RAID may establish its own placement data, which may be referred to as virtual placement data to distinguish it from placement data 530 as used by the data SSDs 325 of FIG. 3. Storage device 120 of FIG. 1 may associate lifetime data 515 of FIG. 5 with the virtual placement data exposed by the RAID, and the RAID may associate the virtual placement data with placement data 530 of data SSDs 325 of FIG. 3. Thus, for example, in table 705, virtual placement data 710-1, 710-2, and 710-3 are shown, which may be referred to collectively as virtual placement data 710: virtual placement data 710-1, 710-2, and 710-3 are associated with placement data 530-1, 530-2, and 530-3, respectively.

While FIG. 7 shows table 705 as having three associations, embodiments of the disclosure may support any number (one or more) of associations in table 705.

Figure 8A:
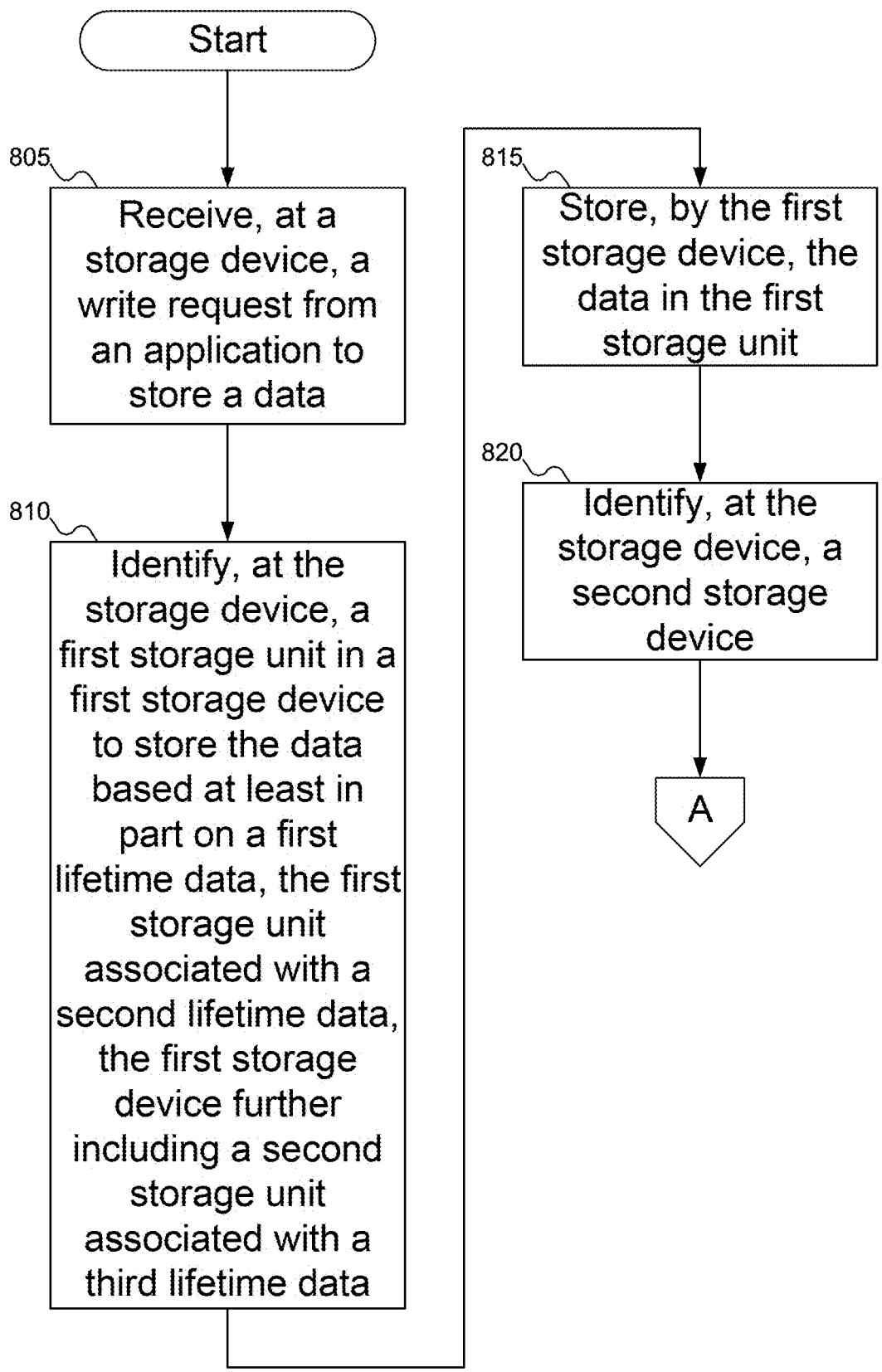
FIG. 8A shows a flowchart of an example procedure for the storage device of FIG. 1 to receive and process a write request from the application of FIGS. 3A-3B, according to embodiments of the disclosure.
Figure 8B:
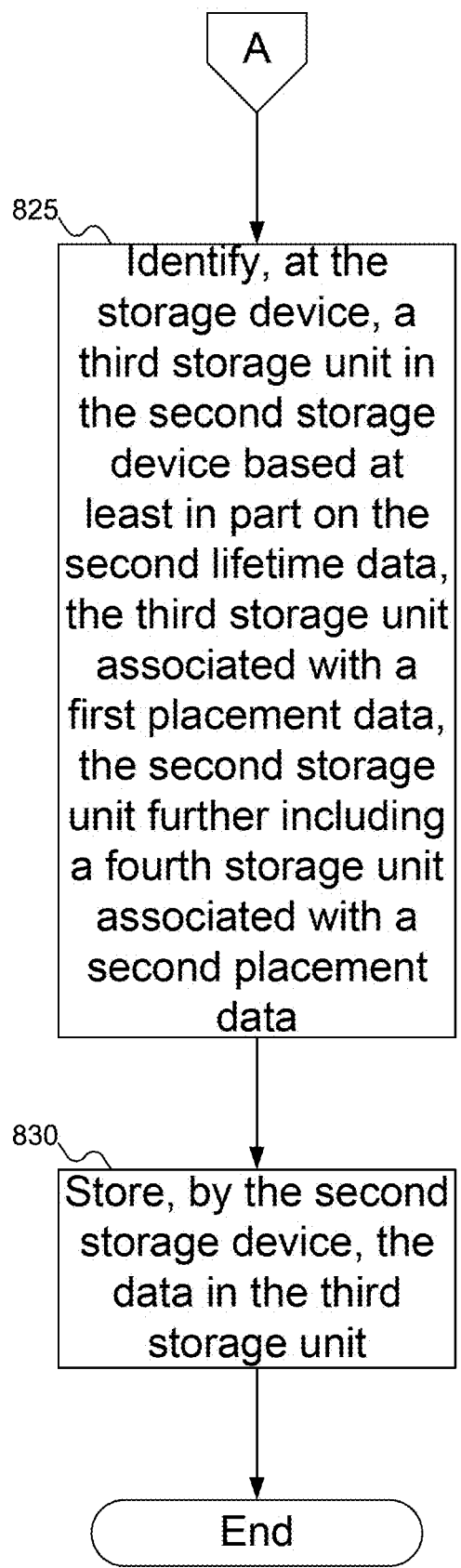
FIG. 8B continues the flowchart of FIG. 8A of an example procedure for the storage device of FIG. 1 to receive and process a write request from the application of FIGS. 3A-3B, according to embodiments of the disclosure.

FIGS. 8A-8B show a flowchart of an example procedure for storage device 120 of FIG. 1 to receive and process write request 310 of FIGS. 3A-3B from the application of FIGS. 3A-3B, according to embodiments of the disclosure. In FIG. 8A, at block 805, storage device 120 may receive write request 305 of FIGS. 3A-3B from application 305 of FIGS. 3A-3B. At block 810, storage device 120 may identify cache SSD 320 of FIGS. 3A-3B to store the data. Storage device 120 may also identify FIFO unit 505 in cache SSD 320 of FIGS. 3A-3B. Storage device 120 may identify FIFO unit 505 based on lifetime data 515 for the data in write request 310 of FIGS. 3A-3B. At block 815, cache SSD 320 of FIGS. 3A-3B may store the data in FIFO unit 505.

At block 820, storage device 120 may identify data SSD 325 of FIGS. 3A-3B. Note that it is implied that cache SSD 320 of FIGS. 3A-3B in block 810 that there is only one cache SSD 320 of FIGS. 3A-3B, and therefore there is no need to identify cache SSD 320 of FIGS. 3A-3B; but in embodiments of the disclosure including more than one cache SSD 320 of FIGS. 3A-3B, storage device 120 may also identify cache SSD 320 of FIGS. 3A-3B prior to block 810.

At block 825 (FIG. 8B), storage device 120 may identify reclaim unit 520 in data SSD 325 of FIGS. 3A-3B. Storage device 120 may identify reclaim unit 520 based on lifetime data 515. Finally, at block 830, data SSD 325 of FIGS. 3A-3B may store the data in reclaim unit 520.

Figure 9:
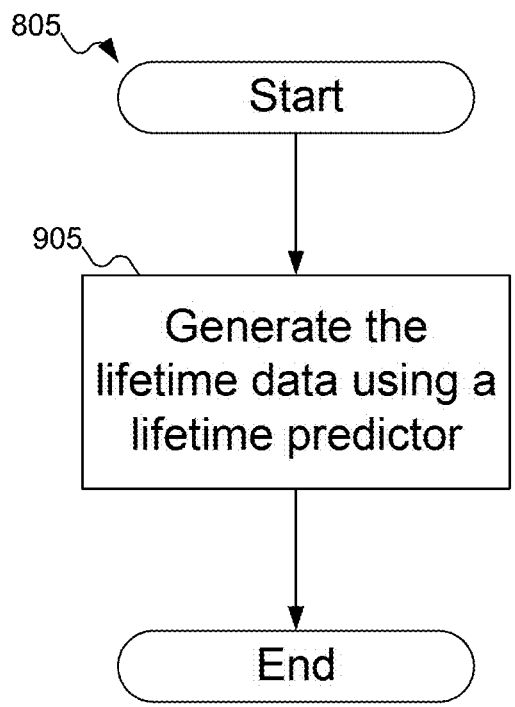
FIG. 9 shows a flowchart of an example procedure for the storage device of FIG. 1 to use the lifetime predictor of FIGS. 3A-3B, according to embodiments of the disclosure.

FIG. 9 shows a flowchart of an example procedure for storage device 120 of FIG. 1 to use lifetime predictor 330 of FIGS. 3A-3B, according to embodiments of the disclosure. In FIG. 9, at block 905, lifetime predictor 330 may receive information, such as write request 310 of FIGS. 3A-3B, and may use that information to generate lifetime data 515 for the data in write request 310 of FIGS. 3A-3B.

Figure 10:
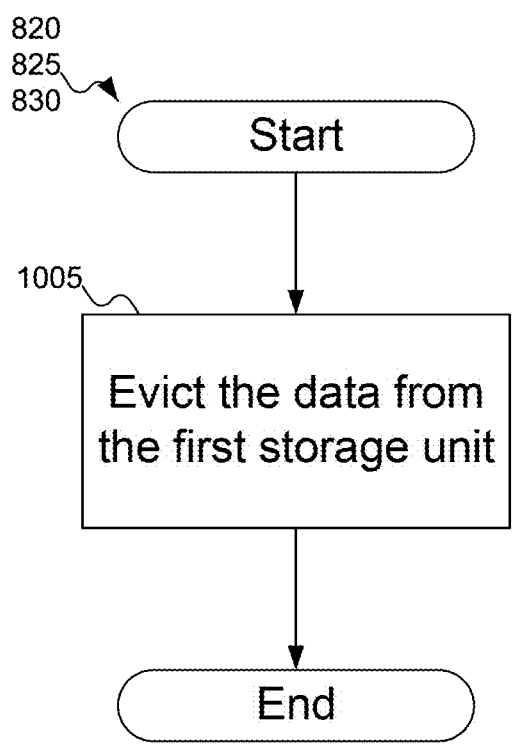
FIG. 10 shows a flowchart of an example procedure for the cache SSD of FIGS. 3A-3B to evict data to the data SSD of FIGS. 3A-3B, according to embodiments of the disclosure.

FIG. 10 shows a flowchart of an example procedure for cache SSD 320 of FIGS. 3A-3B to evict data to data SSD 325 of FIGS. 3A-3B, according to embodiments of the disclosure. In FIG. 10, at block 1005, cache SSD 320 of FIGS. 3A-3B may evict the data from FIFO unit 505 after the data has been written to data SSD 325 of FIGS. 3A-3B.

Figure 11:
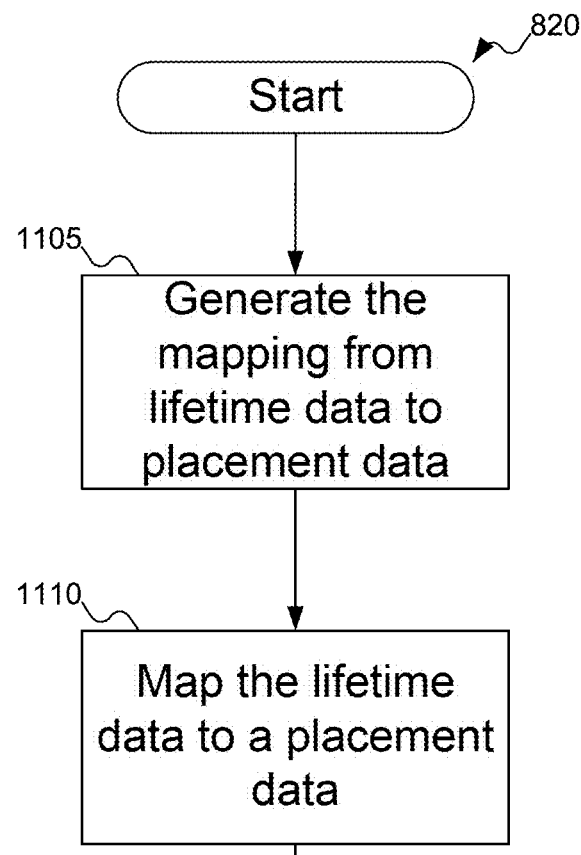
FIG. 11 shows a flowchart of an example procedure for the storage device of FIG. 1 to map the lifetime data of FIGS. 3A-3B to the placement data of FIGS. 3A-3B, according to embodiments of the disclosure.

FIG. 11 shows a flowchart of an example procedure for storage device 120 of FIG. 1 to map lifetime data 515 of FIG. 5 to placement data 530 of FIG. 5, according to embodiments of the disclosure. In FIG. 11, at block 1105, storage device 120 may generate table 615 to map lifetime data 515 to placement data 530. Then, at block 1110, storage device 120 may use table 615 to map lifetime data 515 for the data to be written in write request 310 of FIGS. 3A-3B to placement data 530.

Figure 12:
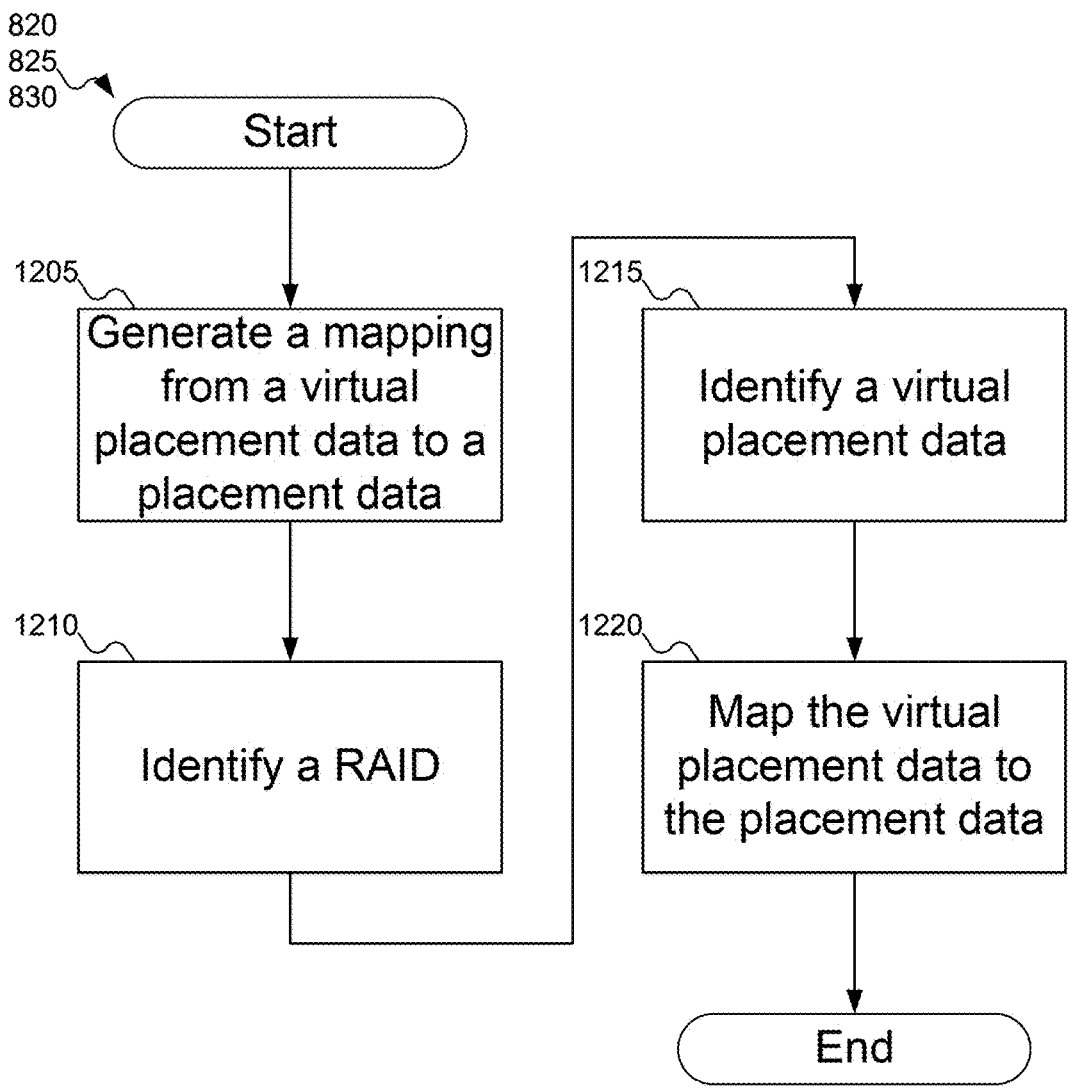
FIG. 12 shows a flowchart of an example procedure for the RAID of FIG. 3B to map the virtual placement data of FIG. 7 to the placement data of FIG. 3B, according to embodiments of the disclosure.

FIG. 12 shows a flowchart of an example procedure for the RAID of FIG. 3B to map virtual placement data 710 of FIG. 7 to placement data 530 of FIG. 5, according to embodiments of the disclosure. In FIG. 12, at block 1205, RAID 340 of FIGS. 3A-3B may generate table 705 to map virtual placement data 710, as exposed by RAID 340 of FIGS. 3A-3B, to placement data 530 as used by data SSD 325 of FIGS. 3A-3B. At block 1210, the RAID may be identified. At block 1215, RAID 340 of FIGS. 3A-3B may identify virtual placement data 710 provided by storage device 120, and at block 1220, RAID 340 of FIGS. 3A-3B may use table 705 to map virtual placement data 710 to placement data 530.

Figure 13:
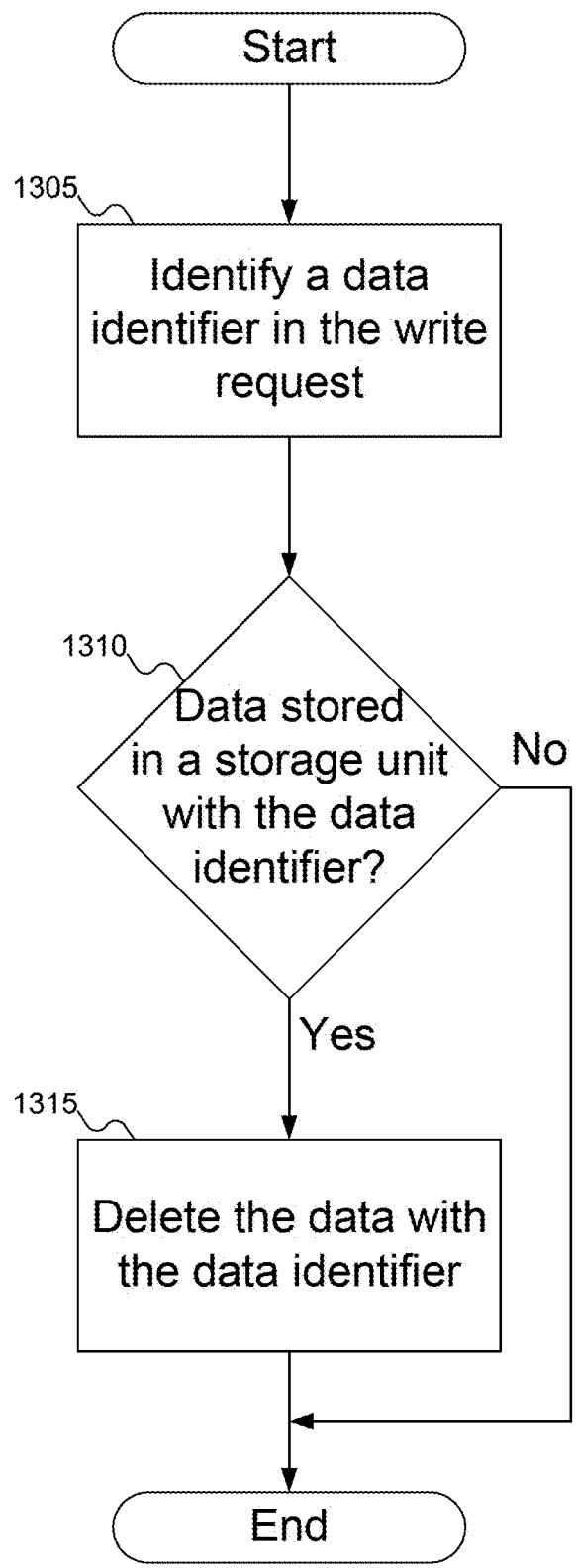
FIG. 13 shows a flowchart of an example procedure for the bloom filter of FIGS. 3A-3B to eliminate old data from the cache SSD of FIGS. 3A-3B, according to embodiments of the disclosure.

FIG. 13 shows a flowchart of an example procedure for bloom filter 335 of FIGS. 3A-3B to eliminate old data from cache SSD 320 of FIGS. 3A-3B, according to embodiments of the disclosure. In FIG. 13, at block 1305, bloom filter 335 of FIGS. 3A-3B may identify data identifier 610 in write request 310 of FIGS. 3A-3B. At block 1310, bloom filter 335 of FIGS. 3A-3B may determine whether there is data stored in another FIFO unit 505 in cache SSD 320 of FIGS. 3A-3B associated with data identifier 610. If so, then at block 1315, bloom filter 335 of FIGS. 3A-3B may send cache SSD 320 of FIGS. 3A-3B a request to delete that data from FIFO unit 505. Note that blocks 1310-1315 may be repeated more than once, should it happen that there are multiple data associated with data identifier 610 stored in cache SSD 320 of FIGS. 3A-3B.

In FIGS. 8A-13, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may include a cache SSD and a data SSD. The cache SSD may be used to store data temporarily for higher performance, and the data may later be transferred to the data SSD for storage in a storage device of greater capacity. The cache SSD may store data using lifetime data provided by the application or generated by a machine learning model, which may reduce the need for garbage collection on the cache SSD. The data SSD may store data using placement data which may be based on the lifetime data, which may also reduce the need for garbage collection on the data SSD. By reducing the need for garbage collection on the cache and data SSDs, a technical advantage of greater efficiency may be achieved.

An SSD cache may be implemented using high-performance SSDs to improve performance and life time of high-capacity low-endurance SSDs. But, there may be performance and lifetime issues. Eviction/Flush mechanisms may incur fragmented flash blocks. Frequent garbage collection activity may decrease cache performance.

Embodiments of the disclosure may address such concerns by placing data with similar lifetimes storage units (which may be sequential storage units) using a Flexible Data Placement (FDP) standard. If the application does not provide a lifetime identifier (LTID), a machine learning model, such as Seq2Seq models, may be used to predict the lifetime ID for the data.

The oldest data in a storage unit may be evicted from the SSD cache first and flushed to a reclaim unit in the low-endurance SSDs for storage. The reclaim unit may be associated with a placement identifier (PLID), which may be mapped from the LTID.

Embodiments of the disclosure may have advantages of reduced Write Amplification Factor (WAF) and increased sustaining cache performance. Embodiments of the disclosure may extend the lifespan of both the Cache and Data SSDs, and may provide for a consistent cache response time.

To reduce the WAF with data placement using an application-provided or predicted data lifetime, a machine learning model, such as Seq2Seq models, may be trained using application read (or write) sequences. Then, if the application does not provide an LTID, the machine learning model may be used to predict the LTID.

A bloom filter may be used to check if the same Block address exists in another storage units in the SSD cache (but with a different LTID). If so, then the existing data may be deleted from the SSD cache (the more current data in the current write request would replace that older data).

The SSD cache may be partitioned into various storage units, which may be assigned different LTIDs. In addition, there may be a mapping from each LTID as used by the SSD cache to PLIDs as used by the Data SSDs, which may implement FDP. This mapping may be stored as cache metadata. Note that multiple different LTIDs as used by the Cache SSD may map to a given PLID as used by the Data SSDs.

Data may be flushed from storage units to the Data SSDs. The oldest data may be evicted from a particular storage unit in the Cache SSD first.

The machine learning model may utilize a Read Seq2Seq model, which may predict read addresses and probabilities are predicted by Seq2Seq model. The models may be trained using each application's read sequences. While Seq2Seq models are commonly used for prefetch, they may be adapted to other uses. Seq2Seq models include Long-Short Memory Models (LSTMs) or Attention based Models. Addresses in an application's short read sequence may have high similarity in their lifetimes. Thus, when a write address is input to the trained Seq2Seq model, the probabilities may be interpreted as the lifetime and the output addresses may be interpreted as other addresses with similar lifetimes.

Lifetime tracking may search for an LTID for an application's write block address. The first-hit LTID may be used. The Seq2Seq model may predict similar lifetime addresses for missing addresses, and may search again the lifetime table. If the address is still missing, the Seq2Seq model may create a new LTID.

An LTID may map to limited PLIDs. For example, an SSD might have 8 PLIDs. PLIDs may be assigned to LTIDs in a round-robin fashion.

Data may be placed in storage units in the Cache SSD associated with the LTIDs assigned to the write request. Data may be flushed from the Cache SSD to the Data SSD with the PLID associated with the LTID. The oldest data (first in) may be evicted, and a trim request may be issued to the Data SSD. In this manner, data blocks may be invalidated without fragmentation in the storage unit on the Data SSD.

A Redundant Array of Independent Disks (RAID) implementation may protect against data loss due to the failure of a drive (redundancy) and may spread data across multiple drives (expediting data access). Implementing a RAID using Solid State Drives (SSDs) may improve the performance and the lifetime of the SSDs in the RAID: by spreading data across multiple SSDs, the array of SSDs may return data faster than an individual SSD might, and may reduce the amount of data written to any individual SSD, thereby extending its lifetime.

But because SSDs may not support overwriting data in place, when data is updated the original data is written (as updated) to a new location on the SSD, and the original data is invalidated. Such repeated writing of the data may happen even if the data is not updated. For example, if the data is in an erase block that is selected for erasure, the remaining valid data in the erase block may be copied to a new erase block so that the original erase block may be erased. This process may be described as garbage collection.

The repeated writing of data may be described as a write amplification factor (WAF), and it is desirable to keep the WAF as low as possible (ideally, 1, which indicates that the data is written only once before it is invalidated by the host).

A RAID of SSDs may be used as a cache. But the eviction mechanism is a cache may result in partially invalidated erase blocks. As erase blocks become partially invalidated, garbage collection may increase to keep blocks available for new data. This increased garbage collection may result in reduced RAID performance: SSDs performing garbage collection might delay the return of data requested by the host. This increased garbage collection may also increase the WAF.

Embodiments of the disclosure may have applications provide lifespan hints to the SSD cache. The RAID may then place data with the same lifespan in a common blocks to remove scattered invalidated pages. Embodiments of the disclosure may provide a high sustaining cache performance, lower WAF in all raid member SSDs, and an extended SSD lifetime.

Embodiments of the disclosure may translate the lifespan to a data placement directive (DPD), and place data in a cache shard according to DPD. The RAID may then split data into data parts based on the DPD. The individual SSDs may then place data parts in flash blocks assigned to the DPD. An index shard may evict data in a first-in, first out (FIFO) order.

Embodiments of the disclosure may reduce SSD WAF by leveraging application-specified Data Lifespan in an enclosure cache that may use a flexible data placement technology. The cache may be partitioned according to a Placement Directive (PD) representing the application data lifespan.

A Bloom Filter may check to see if the same Logical Block Address (LBA) exists in other Shards (a different lifespan). If so, then the existing LBA may be removed.

A Shard may write a Flush Unit (FU) to the SSDs using a FIFO policy. Cached data may be re-ordered using a Least Recently Used (LRU) policy within the FU.

A Reclaim Group (RG) may include multiple SSDs (or data from multiple SSDs) to select a RAID-aggregated Reclaim Unit (RU) size suitable for the FU size in the enclosure memory.

The RAID may use the PD in writing data to members of the RAID. Cache Metadata (e.g., logging) may be assigned a separate Placement ID.

Embodiments of the disclosure may achieve a lower WAF in all RAID members, high sustaining cache performance, and extended SSD lifetime.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage device, comprising:
  an interface to receive a write request from an application to store a data;
  a first storage device to act as a cache, the first storage device including a first storage unit associated with a first lifetime data and a second storage unit associated with a second lifetime data;
  a second storage device to act as a persistent storage, the second storage device including a third storage unit associated with a first placement data and a fourth storage unit associated with a second placement data;
  wherein the first storage device is configured to store the data in the first storage unit associated with the first lifetime data based on a third lifetime data; and
  wherein the second storage device is configured to store the data in the third storage unit associated with the first placement data based at least in part on the third lifetime data.

Statement 2. An embodiment of the disclosure includes the storage device according to statement 1, wherein:
  the first storage device includes a first Solid State Drive (SSD); and
  the second storage device includes a second SSD.

Statement 3. An embodiment of the disclosure includes the storage device according to statement 2, wherein:
  the first SSD includes a first high-performance SSD; and
  the second SSD includes a high-capacity, low-endurance SSD.

Statement 4. An embodiment of the disclosure includes the storage device according to statement 1, further comprising an enclosure, the enclosure including the interface, the first storage device, and the second storage device.

Statement 5. An embodiment of the disclosure includes the storage device according to statement 1, wherein:
  the first lifetime data includes a first lifetime identifier (LTID);
  the second lifetime data includes a second LTID;
  the third lifetime data includes a third LTID; and
  the third LTID corresponds to the first LTID.

Statement 6. An embodiment of the disclosure includes the storage device according to statement 1, wherein the write request includes the third lifetime data.

Statement 7. An embodiment of the disclosure includes the storage device according to statement 1, further comprising a lifetime predictor to generate the third lifetime data.

Statement 8. An embodiment of the disclosure includes the storage device according to statement 7, wherein the lifetime predictor includes a machine learning circuit to generate the third lifetime data.

Statement 9. An embodiment of the disclosure includes the storage device according to statement 8, wherein the machine learning circuit implements a Seq2Seq model.

Statement 10. An embodiment of the disclosure includes the storage device according to statement 7, wherein:
  the storage device further comprises a processor; and
  the lifetime predictor includes a machine learning software running on the processor.

Statement 11. An embodiment of the disclosure includes the storage device according to statement 10, wherein the machine learning software implements a Seq2Seq model.

Statement 12. An embodiment of the disclosure includes the storage device according to statement 7, wherein the write request does not include the third lifetime data.

Statement 13. An embodiment of the disclosure includes the storage device according to statement 1, wherein:
  the first storage device is configured to evict the data from the first storage unit; and
  the second storage device is configured to store the data in the third storage unit based at least in part on the first storage device evicting the data from the first storage unit.

Statement 14. An embodiment of the disclosure includes the storage device according to statement 13, wherein the first storage device is configured to evict the data from the first storage unit based at least in part on an age of the data in the first storage unit.

Statement 15. An embodiment of the disclosure includes the storage device according to statement 14, wherein the first storage device is configured to evict the data from the first storage unit based at least in part on the data being an oldest data in the first storage unit.

Statement 16. An embodiment of the disclosure includes the storage device according to statement 1, further including a mapping circuit to map the first lifetime data to the first placement data.

Statement 17. An embodiment of the disclosure includes the storage device according to statement 16, wherein the mapping circuit includes a table to map the first lifetime data to the first placement data.

Statement 18. An embodiment of the disclosure includes the storage device according to statement 17, wherein the storage device is configured to generate the table at bootup of the storage device.

Statement 19. An embodiment of the disclosure includes the storage device according to statement 1, wherein:
  the second storage device implements a Flexible Data Placement (FDP) standard;
  the first placement data includes a first placement identifier (PLID); and
  the second placement data includes a second PLID.

Statement 20. An embodiment of the disclosure includes the storage device according to statement 19, wherein:
  the third storage unit includes a first restatement unit; and
  the fourth storage unit includes a second restatement unit.

Statement 21. An embodiment of the disclosure includes the storage device according to statement 1, further comprising:
  a Redundant Array of Independent Disks (RAID) logic; and
  a third storage device,
  wherein the RAID logic stores data on the second storage device and the third storage device.

Statement 22. An embodiment of the disclosure includes the storage device according to statement 21, wherein the RAID logic includes a RAID circuit.

Statement 23. An embodiment of the disclosure includes the storage device according to statement 21, wherein the RAID logic includes:
a processor; and
software to implement the RAID logic running on the processor.

Statement 24. An embodiment of the disclosure includes the storage device according to statement 21, wherein:
the third storage device includes a fifth storage unit associated with a third placement data and a sixth storage unit associated with a fourth placement data;
the RAID logic includes a mapping logic to map a first virtual placement data to the first placement data and the third placement data, and to map a second virtual placement data to the second placement data and the fourth placement data; and
the RAID logic is configured to expose the first virtual placement data and the second virtual placement data to the storage device.

Statement 25. An embodiment of the disclosure includes the storage device according to statement 24, wherein the mapping logic includes a mapping circuit.

Statement 26. An embodiment of the disclosure includes the storage device according to statement 25, wherein the mapping circuit includes a table to map the first virtual placement data to the first placement data and the third placement data, and to map a second virtual placement data to the second placement data and the fourth placement data.

Statement 27. An embodiment of the disclosure includes the storage device according to statement 26, wherein the RAID logic is configured to generate the table at bootup.

Statement 28. An embodiment of the disclosure includes the storage device according to statement 24, wherein the mapping logic includes:
a processor; and
software to implement the mapping logic running on the processor.

Statement 29. An embodiment of the disclosure includes the storage device according to statement 1, further comprising a bloom filter.

Statement 30. An embodiment of the disclosure includes the storage device according to statement 29, wherein the bloom filter is configured to identify a second data stored in the second storage unit and to delete the second data from the second storage unit.

Statement 31. An embodiment of the disclosure includes the storage device according to statement 30, wherein the bloom filter is configured to identify the second data stored in the second storage unit and to delete the second data from the second storage unit based at least in part on the write request from the application.

Statement 32. An embodiment of the disclosure includes the storage device according to statement 30, wherein:
the write request includes a data identifier associated with the data; and
the bloom filter is configured to identify the second data stored in the second storage unit based at least in part on the second data associated with data identifier.

Statement 33. An embodiment of the disclosure includes the storage device according to statement 32, wherein the data identifier includes a logical block address.

Statement 34. An embodiment of the disclosure includes a method, comprising:
receiving, at a storage device, a write request from an application to store a data;
identifying, at the storage device, a first storage unit in a first storage device to store the data based at least in part on a first lifetime data, the first storage unit associated with a second lifetime data, the first storage device further including a second storage unit associated with a third lifetime data;
storing, by the first storage device, the data in the first storage unit;
identifying, at the storage device, a second storage device;
identifying, at the storage device, a third storage unit in the second storage device based at least in part on the second lifetime data, the third storage unit associated with a first placement data, the second storage unit further including a fourth storage unit associated with a second placement data; and
storing, by the second storage device, the data in the third storage unit.

Statement 35. An embodiment of the disclosure includes the method according to statement 34, wherein:
the first storage device includes a first Solid State Drive (SSD); and
the second storage device includes a second SSD.

Statement 36. An embodiment of the disclosure includes the method according to statement 35, wherein:
the first SSD includes a first high-performance SSD; and
the second SSD includes a high-capacity, low-endurance SSD.

Statement 37. An embodiment of the disclosure includes the method according to statement 34, wherein:
the first lifetime data includes a first lifetime identifier (LTID);
the second lifetime data includes a second LTID;
the third lifetime data includes a third LTID; and
the first LTID corresponds to the third LTID.

Statement 38. An embodiment of the disclosure includes the method according to statement 34, wherein the write request includes the first lifetime data.

Statement 39. An embodiment of the disclosure includes the method according to statement 34, further comprising generating, by a lifetime predictor, the first lifetime data.

Statement 40. An embodiment of the disclosure includes the method according to statement 39, wherein generating, by the lifetime predictor, the first lifetime data includes generating, by a machine learning model, the first lifetime data.

Statement 41. An embodiment of the disclosure includes the method according to statement 40, wherein generating, by the machine learning model, the first lifetime data includes generating, by a Seq2Seq model, the first lifetime data.

Statement 42. An embodiment of the disclosure includes the method according to statement 39, wherein the write request does not include the third lifetime data.

Statement 43. An embodiment of the disclosure includes the method according to statement 34, further comprising evicting the data from the first storage unit.

Statement 44. An embodiment of the disclosure includes the method according to statement 43, wherein:
identifying, at the storage device, the second storage device includes identifying, at the storage device, the second storage device based at least in part on evicting the data from the first storage unit;
identifying, at the storage device, the third storage unit in the second storage device based at least in part on the second lifetime data includes identifying, at the storage device, the third storage unit in the second storage device based at least in part on the second lifetime data based at least in part on evicting the data from the first storage unit; and storing, by the second storage device, the data in the third storage unit includes storing, by the second storage device, the data in the third storage unit based at least in part on evicting the data from the first storage unit.

Statement 45. An embodiment of the disclosure includes the method according to statement 43, wherein evicting the data from the first storage unit includes evicting the data from the first storage unit based at least in part on an age of the data in the first storage unit.

Statement 46. An embodiment of the disclosure includes the method according to statement 45, wherein evicting the data from the first storage unit based at least in part on an age of the data in the first storage unit includes evicting the data from the first storage unit based at least in part on the data being an oldest data in the first storage unit.

Statement 47. An embodiment of the disclosure includes the method according to statement 34, wherein identifying, at the storage device, the third storage unit in the second storage device based at least in part on the second lifetime data includes mapping the second lifetime data to the first placement data.

Statement 48. An embodiment of the disclosure includes the method according to statement 47, wherein mapping the second lifetime data to the first placement data includes mapping the second lifetime data to the first placement data using a table.

Statement 49. An embodiment of the disclosure includes the method according to statement 48, further comprising generating the table mapping the second lifetime data to the first placement data.

Statement 50. An embodiment of the disclosure includes the method according to statement 49, wherein generating the table mapping the second lifetime data to the first placement data includes generating the table mapping the second lifetime data to the first placement data at bootup of the storage device.

Statement 51. An embodiment of the disclosure includes the method according to statement 34, wherein:
the second storage device implements a Flexible Data Placement (FDP) standard;
the first placement data includes a first placement identifier (PLID); and
the second placement data includes a second PLID.

Statement 52. An embodiment of the disclosure includes the method according to statement 51, wherein:
the third storage unit includes a first restatement unit; and
the fourth storage unit includes a second restatement unit.

Statement 53. An embodiment of the disclosure includes the method according to statement 34, wherein identifying, at the storage device, the second storage device includes identifying, at the storage device, a Redundant Array of Independent Disks (RAID), the RAID including second storage device and a third storage device.

Statement 54. An embodiment of the disclosure includes the method according to statement 53, wherein the third storage device includes a fifth storage unit associated with a third placement data and a sixth storage unit associated with a fourth placement data.

Statement 55. An embodiment of the disclosure includes the method according to statement 53, wherein identifying, at the storage device, the third storage unit in the second storage device based at least in part on the second lifetime data includes:
identifying, at the storage device, a first virtual placement data exposed by the RAID based at least in part on the second lifetime data; and
mapping, by the RAID, the first virtual placement data exposed by the RAID to the first placement data.

Statement 56. An embodiment of the disclosure includes the method according to statement 55, wherein the RAID maps a second virtual placement data exposed by the RAID to the second placement data.

Statement 57. An embodiment of the disclosure includes the method according to statement 56, wherein:
the third storage device includes a fifth storage unit associated with a third placement data and a sixth storage unit associated with a fourth placement data; and
the RAID maps the first virtual placement data to the first placement data and the third placement data, and maps the second virtual placement data to the second placement data and the fourth placement data.

Statement 58. An embodiment of the disclosure includes the method according to statement 55, wherein mapping, by the RAID, the first virtual placement data exposed by the RAID to the first placement data includes mapping, by the RAID, the first virtual placement data exposed by the RAID to the first placement data using a table.

Statement 59. An embodiment of the disclosure includes the method according to statement 58, further comprising generating the table mapping the first virtual placement data exposed by the RAID to the first placement data.

Statement 60. An embodiment of the disclosure includes the method according to statement 59, wherein generating the table mapping the first virtual placement data exposed by the RAID to the first placement data includes generating the table mapping the first virtual placement data exposed by the RAID to the first placement data at bootup of the storage device.

Statement 61. An embodiment of the disclosure includes the method according to statement 34, further comprising:
identifying, at the storage device, a second data in the second storage unit; and
deleting, at the first storage device, the second data from the second storage unit.

Statement 62. An embodiment of the disclosure includes the method according to statement 61, further comprising:
identifying, at the storage device, the second data in the second storage unit includes identifying, at the storage device, the second data in the second storage unit based at least in part on the write request from the application.

Statement 63. An embodiment of the disclosure includes the method according to statement 61, wherein:
the write request includes a data identifier associated with the data; and
identifying, at the storage device, the second data in the second storage unit includes identifying, at the storage device, the second data in the second storage unit based at least in part on the second data associated with the data identifier.

Statement 64. An embodiment of the disclosure includes the method according to statement 63, wherein the data identifier includes a logical block address.

Statement 65. An embodiment of the disclosure includes an article, comprising a non-transitory storage medium, the non-transitory storage medium having stored thereon instructions that, when executed by a machine, result in:
receiving, at a storage device, a write request from an application to store a data;
identifying, at the storage device, a first storage unit in a first storage device to store the data based at least in part on a first lifetime data, the first storage unit associated with a second lifetime data, the first storage device further including a second storage unit associated with a third lifetime data;
storing, by the first storage device, the data in the first storage unit;
identifying, at the storage device, a second storage device;
identifying, at the storage device, a third storage unit in the second storage device based at least in part on the second lifetime data, the third storage unit associated with a first placement data, the second storage unit further including a fourth storage unit associated with a second placement data; and
storing, by the second storage device, the data in the third storage unit.

Statement 66. An embodiment of the disclosure includes the article according to statement 65, wherein:
the first storage device includes a first Solid State Drive (SSD); and
the second storage device includes a second SSD.

Statement 67. An embodiment of the disclosure includes the article according to statement 66, wherein:
the first SSD includes a first high-performance SSD; and
the second SSD includes a high-capacity, low-endurance SSD.

Statement 68. An embodiment of the disclosure includes the article according to statement 65, wherein:
the first lifetime data includes a first lifetime identifier (LTID);
the second lifetime data includes a second LTID;
the third lifetime data includes a third LTID; and
the first LTID corresponds to the third LTID.

Statement 69. An embodiment of the disclosure includes the article according to statement 65, wherein the write request includes the first lifetime data.

Statement 70. An embodiment of the disclosure includes the article according to statement 65, the non-transitory storage medium having stored thereon further instructions that, when executed by the machine, result in generating, by a lifetime predictor, the first lifetime data.

Statement 71. An embodiment of the disclosure includes the article according to statement 70, wherein generating, by the lifetime predictor, the first lifetime data includes generating, by a machine learning model, the first lifetime data.

Statement 72. An embodiment of the disclosure includes the article according to statement 71, wherein generating, by the machine learning model, the first lifetime data includes generating, by a Seq2Seq model, the first lifetime data.

Statement 73. An embodiment of the disclosure includes the article according to statement 70, wherein the write request does not include the third lifetime data.

Statement 74. An embodiment of the disclosure includes the article according to statement 65, the non-transitory storage medium having stored thereon further instructions that, when executed by the machine, result in evicting the data from the first storage unit.

Statement 75. An embodiment of the disclosure includes the article according to statement 74, wherein:
identifying, at the storage device, the second storage device includes identifying, at the storage device, the second storage device based at least in part on evicting the data from the first storage unit;
identifying, at the storage device, the third storage unit in the second storage device based at least in part on the second lifetime data includes identifying, at the storage device, the third storage unit in the second storage device based at least in part on the second lifetime data based at least in part on evicting the data from the first storage unit; and
storing, by the second storage device, the data in the third storage unit includes storing, by the second storage device, the data in the third storage unit based at least in part on evicting the data from the first storage unit.

Statement 76. An embodiment of the disclosure includes the article according to statement 74, wherein evicting the data from the first storage unit includes evicting the data from the first storage unit based at least in part on an age of the data in the first storage unit.

Statement 77. An embodiment of the disclosure includes the article according to statement 76, wherein evicting the data from the first storage unit based at least in part on an age of the data in the first storage unit includes evicting the data from the first storage unit based at least in part on the data being an oldest data in the first storage unit.

Statement 78. An embodiment of the disclosure includes the article according to statement 65, wherein identifying, at the storage device, the third storage unit in the second storage device based at least in part on the second lifetime data includes mapping the second lifetime data to the first placement data.

Statement 79. An embodiment of the disclosure includes the article according to statement 78, wherein mapping the second lifetime data to the first placement data includes mapping the second lifetime data to the first placement data using a table.

Statement 80. An embodiment of the disclosure includes the article according to statement 79, the non-transitory storage medium having stored thereon further instructions that, when executed by the machine, result in generating the table mapping the second lifetime data to the first placement data.

Statement 81. An embodiment of the disclosure includes the article according to statement 80, wherein generating the table mapping the second lifetime data to the first placement data includes generating the table mapping the second lifetime data to the first placement data at bootup of the storage device.

Statement 82. An embodiment of the disclosure includes the article according to statement 65, wherein:
the second storage device implements a Flexible Data Placement (FDP) standard;
the first placement data includes a first placement identifier (PLID); and
the second placement data includes a second PLID.

Statement 83. An embodiment of the disclosure includes the article according to statement 82, wherein:
the third storage unit includes a first restatement unit; and
the fourth storage unit includes a second restatement unit.

Statement 84. An embodiment of the disclosure includes the article according to statement 65, wherein identifying, at the storage device, the second storage device includes identifying, at the storage device, a Redundant Array of Independent Disks (RAID), the RAID including second storage device and a third storage device.

Statement 85. An embodiment of the disclosure includes the article according to statement 84, wherein the third storage device includes a fifth storage unit associated with a third placement data and a sixth storage unit associated with a fourth placement data.

Statement 86. An embodiment of the disclosure includes the article according to statement 84, wherein identifying, at the storage device, the third storage unit in the second storage device based at least in part on the second lifetime data includes:

identifying, at the storage device, a first virtual placement data exposed by the RAID based at least in part on the second lifetime data; and mapping, by the RAID, the first virtual placement data exposed by the RAID to the first placement data.

Statement 87. An embodiment of the disclosure includes the article according to statement 86, wherein the RAID maps a second virtual placement data exposed by the RAID to the second placement data.

Statement 88. An embodiment of the disclosure includes the article according to statement 87, wherein:

the third storage device includes a fifth storage unit associated with a third placement data and a sixth storage unit associated with a fourth placement data; and the RAID maps the first virtual placement data to the first placement data and the third placement data, and maps the second virtual placement data to the second placement data and the fourth placement data.

Statement 89. An embodiment of the disclosure includes the article according to statement 86, wherein mapping, by the RAID, the first virtual placement data exposed by the RAID to the first placement data includes mapping, by the RAID, the first virtual placement data exposed by the RAID to the first placement data using a table.

Statement 90. An embodiment of the disclosure includes the article according to statement 89, the non-transitory storage medium having stored thereon further instructions that, when executed by the machine, result in generating the table mapping the first virtual placement data exposed by the RAID to the first placement data.

Statement 91. An embodiment of the disclosure includes the article according to statement 90, wherein generating the table mapping the first virtual placement data exposed by the RAID to the first placement data includes generating the table mapping the first virtual placement data exposed by the RAID to the first placement data at bootup of the storage device.

Statement 92. An embodiment of the disclosure includes the article according to statement 65, the non-transitory storage medium having stored thereon further instructions that, when executed by the machine, result in:

identifying, at the storage device, a second data in the second storage unit; and deleting, at the first storage device, the second data from the second storage unit.

Statement 93. An embodiment of the disclosure includes the article according to statement 92, further comprising:

identifying, at the storage device, the second data in the second storage unit includes identifying, at the storage device, the second data in the second storage unit based at least in part on the write request from the application.

Statement 94. An embodiment of the disclosure includes the article according to statement 92, wherein:

the write request includes a data identifier associated with the data; and identifying, at the storage device, the second data in the second storage unit includes identifying, at the storage device, the second data in the second storage unit based at least in part on the second data associated with the data identifier.

Statement 95. An embodiment of the disclosure includes the article according to statement 94, wherein the data identifier includes a logical block address.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage device, comprising:
    an interface to receive a write request from an application to store a data;
    a first storage device to act as a cache, the first storage device including a first storage unit associated with a first lifetime data;
    a second storage device to act as a persistent storage, the second storage device including a second storage unit associated with a first placement data;
    wherein the first storage device is configured to store the data in the first storage unit associated with the first lifetime data based on a second lifetime data; and
    wherein the second storage device is configured to store the data in the second storage unit associated with the first placement data based at least in part on the second lifetime data.

2. The storage device according to claim 1, wherein the write request includes the second lifetime data.

3. The storage device according to claim 1, further comprising a lifetime predictor to generate the second lifetime data.

4. The storage device according to claim 1, further including a mapping circuit to map the first lifetime data to the first placement data.

5. The storage device according to claim 1, further comprising:
    a Redundant Array of Independent Disks (RAID) logic; and
    a third storage device,
    wherein the RAID logic stores data on the second storage device and the third storage device.

6. The storage device according to claim 5, wherein:
    the third storage device includes a fifth storage unit associated with a third placement data and a sixth storage unit associated with a fourth placement data;
    the RAID logic includes a mapping logic to map a first virtual placement data to the first placement data and the third placement data, and to map a second virtual placement data to the second placement data and the fourth placement data; and
    the RAID logic is configured to expose the first virtual placement data and the second virtual placement data to the storage device.

7. The storage device according to claim 1, wherein: the first storage device further includes a third storage unit associated with a third lifetime data; and the second storage device further includes a fourth storage unit associated with a second placement data.

8. The storage device according to claim 7, further comprising a bloom filter configured to identify a second data stored in the third storage unit and to delete the second data from the third storage unit based at least in part on the write request from the application.

9. A method, comprising:
    receiving, at a storage device, a write request from an application to store a data;
    identifying, at the storage device, a first storage unit in a first storage device to store the data based at least in part on a first lifetime data, the first storage unit associated with a second lifetime data;
    storing, by the first storage device, the data in the first storage unit;

identifying, at the storage device, a second storage device;

identifying, at the storage device, a second storage unit in the second storage device based at least in part on the second lifetime data, the second storage unit associated with a first placement data; and storing, by the second storage device, the data in the second storage unit.

10. The method according to claim 9, wherein the write request includes the first lifetime data.

11. The method according to claim 9, further comprising generating, by a lifetime predictor, the first lifetime data.

12. The method according to claim 9, further comprising evicting the data from the first storage unit.

13. The method according to claim 12, wherein evicting the data from the first storage unit includes evicting the data from the first storage unit based at least in part on an age of the data in the first storage unit.

14. The method according to claim 9, wherein identifying, at the storage device, the second storage unit in the second storage device based at least in part on the second lifetime data includes mapping the second lifetime data to the first placement data.

15. The method according to claim 9, wherein identifying, at the storage device, the second storage device includes identifying, at the storage device, a Redundant Array of Independent Disks (RAID), the RAID including second storage device and a third storage device.

16. The method according to claim 15, wherein identifying, at the storage device, the second storage unit in the second storage device based at least in part on the second lifetime data includes:

identifying, at the storage device, a first virtual placement data exposed by the RAID based at least in part on the second lifetime data; and mapping, by the RAID, the first virtual placement data exposed by the RAID to the first placement data.

17. The method according to claim 9, wherein: the first storage device further includes a third storage unit associated with a third lifetime data; and the second storage device further including a fourth storage unit associated with a second placement data.

18. The method according to claim 17, wherein:

the write request includes a data identifier associated with the data;

identifying, at the storage device, a second data in the third storage unit based at least in part on the second data associated with the data identifier; and deleting, at the first storage device, the second data from the third storage unit.

19. An article, comprising a non-transitory storage medium, the non-transitory storage medium having stored thereon instructions that, when executed by a machine, result in:

receiving, at a storage device, a write request from an application to store a data;

identifying, at the storage device, a first storage unit in a first storage device to store the data based at least in part on a first lifetime data, the first storage unit associated with a second lifetime data;

storing, by the first storage device, the data in the first storage unit;

identifying, at the storage device, a second storage device;

identifying, at the storage device, a second storage unit in the second storage device based at least in part on the second lifetime data, the second storage unit associated with a first placement data; and storing, by the second storage device, the data in the second storage unit.

20. The article according to claim 19, wherein:

the write request includes a data identifier associated with the data; and the non-transitory storage medium has stored thereon further instructions that, when executed by the machine, result in:

identifying, at the storage device, a second data in a third storage unit of the first storage device based at least in part on the second data associated with the data identifier; and deleting, at the first storage device, the second data from the second storage unit.

* * * * *